United States Patent
Jensen et al.

(10) Patent No.: US 11,073,370 B2
(45) Date of Patent: Jul. 27, 2021

(54) OCT MEASUREMENT DEVICE WITH BACK-REFLECTION

(71) Applicant: HEXAGON TECHNOLOGY CENTER GMBH, Heerbrugg (CH)

(72) Inventors: Thomas Jensen, Rorschach (CH); Zheng Yang, Friedrichshafen (DE)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 37 days.

(21) Appl. No.: 16/533,508

(22) Filed: Aug. 6, 2019

(65) Prior Publication Data
US 2020/0049484 A1 Feb. 13, 2020

(30) Foreign Application Priority Data
Aug. 7, 2018 (EP) .................................. 18187664

(51) Int. Cl.
*G01B 9/02* (2006.01)
*G01B 11/00* (2006.01)
(Continued)

(52) U.S. Cl.
CPC ..... *G01B 9/02015* (2013.01); *G01B 9/02091* (2013.01); *G01B 11/005* (2013.01); *G02B 26/0833* (2013.01); *G02B 26/101* (2013.01)

(58) Field of Classification Search
CPC ........ G01L 39/02015; G01L 39/02091; G02B 26/101; G01B 11/26; G01B 9/02072; G01B 11/2441
See application file for complete search history.

(56) References Cited

U.S. PATENT DOCUMENTS

| 7,061,622 B2 * | 6/2006 | Rollins .............. G01B 11/2441 |
| | | 356/497 |
| 9,903,812 B2 | 2/2018 | Miki |

(Continued)

FOREIGN PATENT DOCUMENTS

| CN | 1779557 A | 5/2006 |
| CN | 104520668 A | 4/2015 |

(Continued)

OTHER PUBLICATIONS

Ford, H.D., and Tatam, R.P., "Coherent fibre bundles in full-field swept source OCT," Proceedings of SPIE, vol. 7168, pp. 71682P-1-71682P-8 (Feb. 12, 2009).

(Continued)

*Primary Examiner* — Hwa Andrew Lee
(74) *Attorney, Agent, or Firm* — Maschoff Brennan

(57) ABSTRACT

An optical system comprising an optical coherence tomography (OCT) measuring device and a beam deflection unit for laterally deflecting the position or angle of a beam path of the OCT measuring device.
There is an optical component in the beam path, said optical component being embodied in such a way that a back-reflection of the optical component has a different configuration in terms of its longitudinal location along the beam path depending on the lateral position of the deflected beam path on the optical component.
The optical system comprises an evaluation unit which is embodied in such a way that a value of the lateral position or angle deflection of the beam deflection unit is determinable on the basis of a longitudinal location of the back-reflection at the optical component determined by the OCT measuring device.

13 Claims, 8 Drawing Sheets

(51) Int. Cl.
*G02B 26/08* (2006.01)
*G02B 26/10* (2006.01)

(56) References Cited

U.S. PATENT DOCUMENTS

| | | | |
|---|---|---|---|
| 9,933,245 | B2 | 4/2018 | Jensen |
| 10,330,461 | B2 | 6/2019 | Robledo et al. |
| 2014/0043468 | A1 | 2/2014 | Engel |
| 2017/0020387 | A1 | 1/2017 | Fingler et al. |
| 2017/0167846 | A1* | 6/2017 | Robledo ............... G01B 21/042 |
| 2017/0261308 | A1 | 9/2017 | Arieli et al. |
| 2017/0307353 | A1 | 10/2017 | Liu et al. |

FOREIGN PATENT DOCUMENTS

| | | |
|---|---|---|
| CN | 105783775 A | 7/2016 |
| CN | 107063117 A | 8/2017 |
| DE | 10 2013 002 400 A1 | 8/2014 |
| DE | 10 2015 216 770 A1 | 3/2016 |
| DE | 20 2017 105 001 A1 | 9/2017 |
| EP | 1706839 B1 | 10/2006 |
| EP | 2 690 395 A1 | 1/2014 |
| EP | 3 182 062 A1 | 6/2017 |
| WO | 2014/096262 A1 | 6/2014 |
| WO | 2017/220510 A1 | 12/2017 |

OTHER PUBLICATIONS

Ford, H.D., and Tatam, R.P., "Fibre imaging bundles for full-field Optical Coherence Tomography," Measurement Science and Technology, vol. 18, Issue 9, pp. 2949-2957 (2007).

Ford, H.D., and Tatam, R.P., "Passive OCT probe head for 3D duct inspection," Measurement Science and Technology, vol. 24, Issue 9, pp. 16 (2013).

Extended Search Report dated Jan. 15, 2019 as received in Application No. 18187664.0.

* cited by examiner

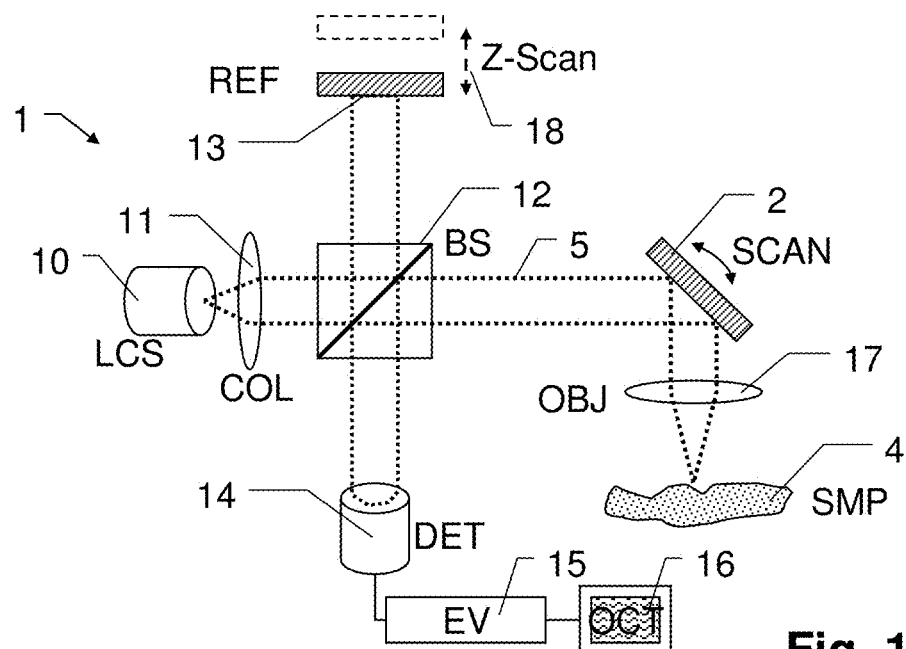
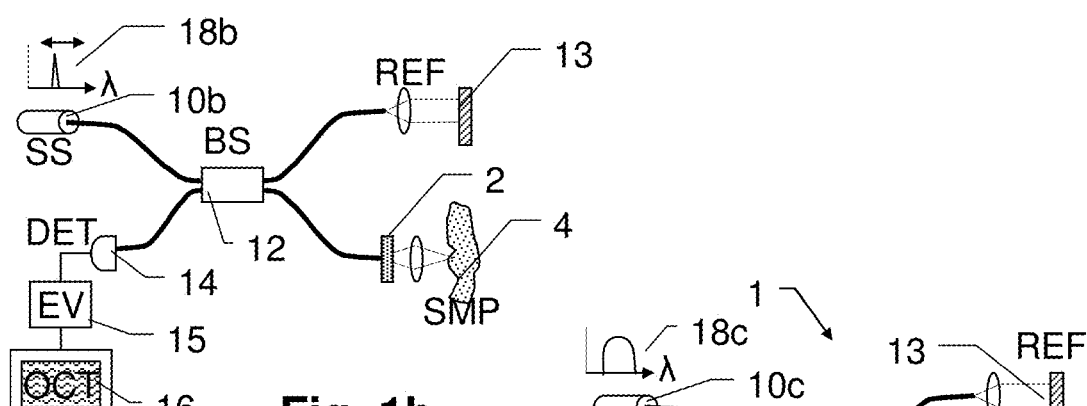
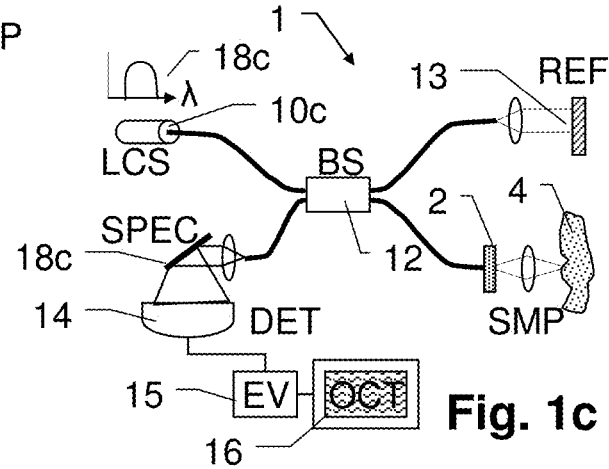
Fig. 1a
Fig. 1b
Fig. 1c

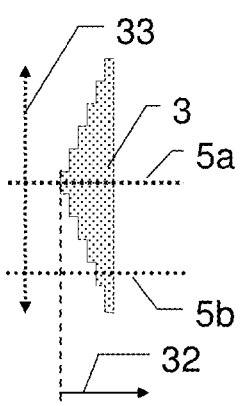 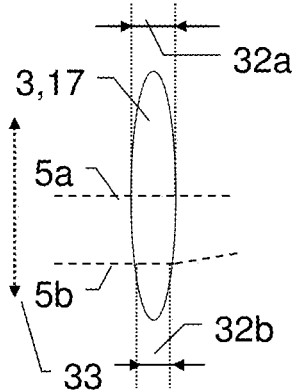 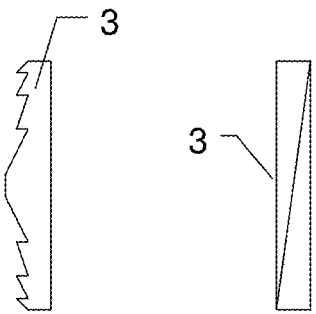 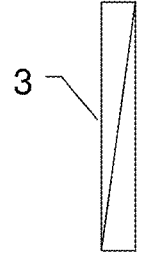
Fig. 11a    Fig. 11b    Fig. 11c    Fig. 11d
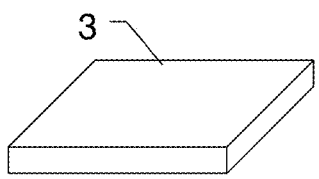 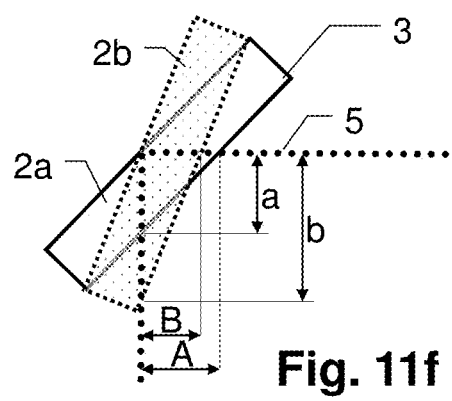
Fig. 11e    Fig. 11f
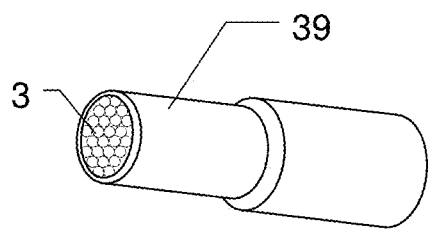
Fig. 11g

OCT MEASUREMENT DEVICE WITH BACK-REFLECTION

CROSS-REFERENCE TO RELATED APPLICATIONS

This application claims priority to European Patent Application No. 18187664, filed on Aug. 7, 2018. The foregoing patent application is herein incorporated by reference.

FIELD OF INVENTION

The invention relates to an optical system with a beam deflection according to the preamble of claim 1 and to a process and a device for ascertaining a value of a beam deflection by means of an OCT measurement. In particular, the invention relates, inter alia, to an exemplary, specific embodiment in a scanning OCT measuring unit or industrial coordinate measuring machine, on the basis of which the invention is explained in detail here in exemplary fashion.

Here, specifically, one embodiment of the invention relates to a scanning OCT (optical coherence tomography) measurement, i.e., optical coherence tomography with a lateral scanning movement of the OCT measurement radiation on the surface of the test object.

BACKGROUND

Measurements on objects by means of optical coherence tomography (OCT) have become established in recent years, not only in medical engineering but also in the industrial field, specifically for non-destructive testing of products, for instance in quality assurance or even inline in production processes. In such OCT, there generally is a contactless measurement on the basis of interferograms of a measurement beam, directed axially into the object depth, with a superposed reference beam within the meaning of white light or low-coherence interferometry. The optical cross correlation arising in the process yields a pattern in this case, which images the strength of light-reflecting structures and the relative optical path length thereof as an axial depth profile. Something specific here is that, in general, the depth resolution is decoupled from the transversal resolution in the case of an OCT measurement since the resultant longitudinal depth resolution in this case depends primarily on the spectral width of the employed light, whereas the transversal resolution is primarily yielded by the numerical aperture of the employed optical unit.

The specific configurations of embodiments of OCT are distinguished here, as a matter of principle, as TD-OCT (=time domain—evaluation in the time domain—e.g., with changing the length of the interferometer reference arm and measuring the intensity) or FD-OCT (frequency domain evaluation in the frequency domain—e.g., with capturing the interference of the individual spectral components). A specific embodiment of FD-OCT, which is very widespread, is represented here by the so-called SS-OCT (swept-source OCT), in which the wavelength of the radiation source is tuned and hence no spectrometer is required as a detector. In accordance with the aforementioned classification, other designations of specific OCT embodiments are a 1D, 2D or 3D OCT, for instance depending on the captured dimensions, in each case with either a TD or FD evaluation, i.e., for example, an SS-OCT as a 1D-FD-OCT or a time-encoded frequency domain OCT as 3D-TD, etc. The so-called full-field OCT (FF-OCT), too, is a further OCT variant. In this case, the present invention is generally applicable independently of the specifically applied embodiment of the OCT measurement, specifically under appropriate boundary conditions.

Since even small signals, e.g., up to a region less than a nanowatt, tend to be detectable using the selective principle of action, a comparatively low input power of the measurement light is sufficient in many applications—specifically in FD-OCT measurements—, as a result of which there is hardly any load on the material to be examined. As a matter of principle, the OCT method in this case also permits a comparatively fast evaluation, e.g., in the region of several kilovoxel, megavoxel or gigavoxel per second. In the case of an appropriate broadband design, e.g., using broadband lasers as a light source, it is possible in this case to obtain a high depth resolution in the range of, for instance, micrometers and even therebelow, for example; this is often referred to as UHR-OCT. The wavelength-dependent penetration depth of the employed electromagnetic radiation is usually one of the primary restrictions when using OCT methods. For instance, exemplary embodiments are found in US 2017/261 308, US 2017/307 353, etc.

In the process, it is optionally also possible, for example, to ascertain further aspects, such as, e.g., a Doppler shift (Doppler OCT, for instance for measuring speed), scattering, absorption, dispersion, change of polarization, of the examined materials, or certain molecules can be searched for selectively (molecular contrast OCT). In a manner that is technologically similar in principle, use is often also made of a so-called optical coherence radar for purely measuring surfaces without noteworthy penetration depth, said optical coherence radar however only representing a profile-providing surface scanning method without tomogram information.

In order to obtain a sufficiently large-area tomogram or profile image or volume capture, the measurement beam must be guided over the surface of the test object in transversal fashion in one or two directions in this case; below, this is also referred to as scanning in this case. Examples are found in WO 2014/096 262 or US 2017/020 387, for instance. Here, this scanning is desirably likewise carried out—especially in light of the aforementioned high resolution of the OCT measuring method per se—with a high position resolution, preferably with a resolution that is at least approximately similar to the transverse position resolution of the OCT method. In many cases, even principles capturing in planar fashion due to their principles, such as an FF-OCT, for instance, require scanning in order to be able to capture sufficiently large surface regions with an appropriate resolution.

By all means, this may be found to be difficult to realize in practice. Here, stationary deflection principles, for example according to the acousto-optic or electro-optic principle, may alternatively also be applied for beam deflection purposes in addition to moving optical elements such as mirrors, prisms, lenses, etc. Moving deflection mirrors (which are usually moved with a rotation or pivot movement) are probably used most frequently in this case. In general, quick and highly precise actuation and position control thereof is found to be challenging, particularly in respect of the position feedback thereof. Especially if small dimensions are additionally sought-after, the use of galvanometers (like in WO 2017/220 510), which are conventionally used to this end, is often also difficult. MEMS—i.e., microsystem technology or microelectromechanical systems—would offer an approach for miniaturization by way of so-called MEMS mirrors (for example in DE 20 2017 105 001 or principles similar to those chips that are used in DLP (projection) chips); however, precisely these are often comparatively strongly nonlinear and depend on dynamics in terms of their deflection and are consequently hardly suitable for a positionally accurate and reliable beam guidance, which is of essence during such scanning. However, such MEMS beam deflections would also offer the prospect of high dynamics of the deflection on account of the small moving mass thereof.

BRIEF DESCRIPTION OF THE INVENTION

It is therefore an object of some aspects of the present invention to improve a beam deflection of light beams, particularly in view of the precise knowledge about their actual position or angle deflection, as a result of which, for example, an accurate positioning of the beam deflection is also facilitated accordingly, for instance using an appropriate control loop. In addition to the positional accuracy, the beam deflection in this case should be not only geometrically precise but, preferably, also quick in time, for example in order to facilitate a fast location control loop for the beam deflection. In some applications, exact regulation to an intended location is not a primary requirement either; instead, it is sufficient only to know the current actual location very accurately. It would also be advantageous if any moving mass in the beam deflection is not increased or at least hardly increased in the process, particularly in order also to be able to obtain high mechanical dynamics of the beam deflection, for instance.

Examples of one of the many possible applications in which such problems arise can be found, inter alia, in metrology for instance, specifically, for instance, in coordinate measuring machines (CMM) with optical test samples or probe heads, or other highly precise measuring appliances for measurements in the micrometer range or below. The invention can also be applied to other metrological methods, which include a scanning motion, exact positioning or directional calibration of measurement radiation, for instance in rangefinders, rotation lasers, laser trackers, tachymeters, total stations, laser scanners, laser markers, etc. However, other applications in industry, research, medicine and technology may also profit from the present invention, specifically if these applications require a deflection of optical work radiation, for instance for measuring, marking or processing tasks, in particular, if these may profit from a fast and/or positionally known, preferably exactly known, beam deflection. Examples include electronics, semiconductor and screen technology, material processing, additive manufacturing methods, etc.

According to some aspects of the invention, these objects are achieved by the features of the independent claims and/or by features of the dependent claims, or these features develop solutions.

Some aspects of the present invention relate to an optical system comprising an optical coherence tomography (OCT) measuring device and a beam deflection unit for laterally deflecting, in particular deflecting the position and/or angle of, a beam path of the OCT measuring device. The optical system can be, in particular, an optical measuring system for ascertaining surface profiles of test objects, for example a part of an OCT scanner or an industrial coordinate measuring machine for optically sensing surfaces in the submillimeter range, or a probe head or a probe head system of such a measuring machine.

Here, an optical component is situated in the beam path, said optical component being embodied in such a way that a back-reflection of the optical component has a different configuration in terms of its longitudinal location along the beam path depending on the lateral position of the deflected beam path. In this sense, the back-reflection is, in particular, a back-reflection that is capturable by means of an OCT measurement, specifically in terms of its longitudinal location along the beam path, for example in a tomogram of the optical component.

Expressed differently, an optical component is situated in the deflected beam path in accordance with the invention, said optical component being embodied in such a way that—depending on the lateral position of the deflected beam path on the optical component—a back-reflection at or in the optical component has a different configuration in terms of its longitudinal location along the beam path.

The optical system comprises an evaluation unit which is embodied in such a way that a value of the lateral position and/or angle deflection of the beam deflection unit is determinable on the basis of a longitudinal location of the back-reflection at the optical component, at the current lateral position, determined by the OCT measuring device.

Here, in one embodiment, the optical component can be specifically arranged downstream of the beam deflection unit and can be transmitted or penetrated by the beam path. In particular, the optical component can be substantially transmitting in relation to the measurement radiation of the OCT measurement, specifically, for instance, transmitting at at least 80% or 90% or more.

In different embodiments, the optical component is introduced as a dedicated component for producing the back-reflection or an optical component that is already present in the beam path for any other purpose is embodied to produce the back-reflection. By way of example, the optical component can be embodied in such a way that it in each case has a back-reflection at different lateral positions on the optical component, preferably a back-reflection of less than 10% or less than 5% of an intensity of optical radiation transmitting the optical object at this position. Here, these back-reflections have a respective different location—and consequently longitudinal distance—in a longitudinal direction, which lies substantially orthogonal to the lateral direction. In particular, the optical component is embodied in such a way here that there is a defined and/or known relationship between the lateral position and longitudinal location. Expressed differently, the optical component can be specifically embodied in such a way that it in each case has a back-reflection at different lateral positions on the optical component, said back-reflection having a different OCT measuring distance in a longitudinal location lying substantially orthogonal to the lateral direction.

The position and/or angle deflection of the beam deflection unit can be determined and a test object can be optically measured by means of the same beam path of the OCT measurement in the optical system, for example in an embodiment for the scanning measurement of surfaces of test objects by means of an OCT measurement.

In a specific embodiment, the beam path can be laterally deflected by the deflection unit onto an input coupling area of a light guide or image-fiber bundle (IFB). Then, the beam path is forwarded in spatially dependent fashion by way of this light guide such that the beam path is output coupled at a lateral point on an output coupling area of the light guide, said lateral point on the output coupling area depending on that lateral point on the input coupling area at which input coupling is effected. Thus, expressed differently, the beam path is output coupled toward a test object at a lateral position on the output coupling area of the light guide that corresponds to an input coupling position. The sites at input and output coupling area can correspond 1:1 in the process, or else correspond according to another, preferably known, function. Examples of such light guides or image fiber bundles are found, inter alia, in DE 10 2013 002 400 or DE 10 2015 216 770, for example, or are described, for example, in publications by H. Ford and R. Tatam, for instance in "Coherent fibre bundles in full-field swept-source OCT" (SPIE 7168, 2009), "Fibre imaging bundles for full-field OCT" (Meas. Sci. Tech. 18, p. 2949, 2007) or "Passive OCT probe head for 3D duct inspection" (Meas. Sci. Tech. 24, no. 9, 2013). Here, the input and output coupling areas may have dimensions of several to hundreds of square millimeters, for example, and may have a spatial resolution of a few micrometers, for example.

In a specific embodiment, the input and/or output coupling area of the light guide may also provide, in this case, a back-reflection for the OCT measurement for ascertaining the value of the current deflection.

Thus, the beam path can be embodied by a light guide, in particular an image fiber bundle, arranged downstream of the beam deflection unit, the deflected beam path being coupled into said light guide and the latter output coupling the radiation at an output coupling point assigned to the input coupling point such that a lateral measurement site on a test object is targeted accordingly, said measurement site depending on the deflection at the input coupling end.

By way of example, the position and/or angle deflection of the beam path can be implemented by a movable, reflecting area. In particular, the deflection unit may be embodied as a microelectromechanical (MEM) mirror deflection unit in one embodiment such that the reflecting area has, for example, a dimension of only a few millimeters or else a dimension of less than one millimeter. Here, the deflection unit of one embodiment may provide a deflection in one dimension. In another embodiment, a deflection in two dimensions may also be implemented.

In one embodiment, part of the deflection unit itself, in particular the reflecting area, may also form the optical component that provides the back-reflection for the OCT measurement.

Here, the optical system according to the invention can be embodied, specifically, as an optical surface measuring system, for example on an OCT scanner unit for highly precisely measuring surfaces, or as part of a coordinate measuring machine (CMM). In particular, the invention can be embodied in the form of a CMM probe head or a CMM probe head system. Specifically, such a probe head can be embodied to provide measuring in the form of optically scanning surfaces of a test object in the sub-millimeter range, in particular by means of the OCT measurement. In one embodiment, such a CMM probe head may also comprise a light guide for the beam path of the OCT measurement.

Expressed differently, an embodiment of some aspects of the present invention can also be described as characterized in that an optical component is situated in the beam path, said optical component being embodied in such a way that a longitudinal location of a back-reflection of the optical component (capturable in a tomogram by means of an OCT measuring device) has a different configuration along the beam path depending on a lateral position of the deflected beam path at the optical component.

Here, an OCT measurement can be formed, for example, using at least one light source (in particular, a broadband light source, a wavelength-tunable light source or a low-coherence laser light source), at least one interferometer (in particular a Michelson or Mirau interferometer, and a common path interferometer such as a Fizeau interferometer or a Linnik interferometer with symmetric optics), at least one reference arm (in particular a reference arm with a fixed or variable length), at least one optical detector (in particular a broadband, spectrally evaluating or narrowband point, line or area sensor) and at least one OCT evaluation unit (in particular embodied for an evaluation of an interferogram according to an OCT measurement principle).

Expressed differently, a longitudinal optical property of an optical component can be measured according to the invention by means of an optical coherence tomography (OCT) measurement in a beam path of the OCT measurement that is deflected by the beam deflection unit, said longitudinal optical property having different embodiments at different lateral positions of the optical component, in particular in a manner known per se. Specifically, a longitudinal optical property of an optical component with a known angle and/or position dependence can be measured in particular in a beam path of the OCT measurement, deflected by the beam deflection unit, in this case using the OCT measurement, and the position and/or angle deflection of the deflection unit can be ascertained on the basis of this longitudinal OCT measurement of the longitudinal optical property.

Here, some aspects of the invention also relate to a process or a method for determining a value of a lateral position or angle deflection of a beam deflection unit in an optical system. Here, the lateral position or angle deflection is variable, for example directly or indirectly by means of an electric actuation signal.

In accordance with some aspects of the invention, at least one longitudinal location of at least one back-reflection at least one optical component in the beam path of measurement radiation—deflected by the beam deflection unit—of the OCT measurement is ascertained here by means of an optical coherence tomography measurement (OCT measurement). Then, the value of the lateral position or angle deflection of the beam deflection unit is ascertained on the basis of the ascertained longitudinal location of the back-reflection.

Here, this value can be provided, specifically, to a measuring unit and/or a control unit of a machine. The deflection of the beam deflection unit can additionally or alternatively also be regulated on the basis of this value using an electronic actuation unit, for example by generating electric actuation signals for the deflection unit.

Here, the value of the lateral position or angle deflection of the beam deflection unit can be determined on the basis of a relationship, in particular a known relationship, between the ascertained longitudinal location of the back-reflection at the optical component and the lateral position of the deflected measurement radiation on the optical component. Here, the optical component can be transmitted by the measurement radiation, in particular. Here, a substantial component of the measurement radiation can transmit, for example at at least 80%, 90% or else more; specifically, such a component of the measurement radiation can transmit the optical component that a test object situated downstream of the optical component in the beam path is measurable using this transmitted component. Here, specifically, the optical component can be embodied in such a way that the latter has a different longitudinal location of the back-reflection that depends, particularly in a manner known per se, on a lateral position of the optical measurement radiation on the optical component.

In one application example, some aspects of the invention can provide a process for determining the deflection in a probe head of a coordinate measuring machine, for example. Here, the probe head can be embodied specifically for a laterally scanning OCT measurement of a surface of a test object and a deflection value of measurement radiation of the OCT measurement can be ascertained in this case according to a method described here. Here, a tomogram measurement on the optical component and a profile-providing measurement on the test object can also be carried out using the same measurement structure in one embodiment.

One embodiment of some aspects of the invention can be embodied, for example, as a device for determining a value of a changeable lateral position and/or angle deflection, said device comprising:

a beam deflection unit for obtaining the changeable lateral position and/or angle deflection, an optical component, in particular a substantially transmissive optical component downstream of the beam deflection unit, an OCT measuring device for determining a longitudinal location of at least one back-reflection, which occurs along a beam path, deflected by the beam deflection unit, of measurement radiation of the OCT measuring device at the optical component, and an evaluation unit embodied in such a way that the value of the lateral position and/or angle deflection of the beam deflection unit is determinable on the basis of the longitudinal location of the back-reflection, determined by the OCT measuring device, at the optical component.

Here, the optical component can be situated in a measurement beam path of the OCT measuring device and specifically be embodied in such a way that, depending on a lateral position of the deflected measurement beam path at the optical component, the back-reflection of the optical component has a different configuration in terms of its longitudinal location along the beam path. Here, the back-reflection can be determined in terms of its longitudinal optical distance along the beam path by means of an OCT measuring device and an associated lateral position of the beam path on the optical component can be deduced from this distance, for example on the basis of a known relationship between lateral position and longitudinal distance.

Expressed differently, an OCT measurement implements a longitudinal measurement of an optical component in a beam path of the OCT measurement, deflected by means of the beam deflection unit, wherein the optical component has an optical property which has a different embodiment in its longitudinal location (along the beam path) in a manner depending on the lateral position, in particular wherein the optical property is an OCT-measurable property which has a different configuration in the lateral direction in a manner known per se. By way of example, the optical component can have, in particular in a manner known per se, angle and/or lateral position-dependent, longitudinal optical locations of at least one measurable OCT reflection in the beam path of the OCT measurement, on the basis of which the lateral position or angle deflection of the beam deflection unit is determined, in particular on the basis of an assignment of the longitudinal optical positions to the angle and/or lateral position thereof, said assignment, for example, being known in advance or being determinable in an initialization or referencing procedure.

In one embodiment, the work light (i.e., for example, the measurement or processing light that should be scanned on the object) can be the same light as that used for the OCT (or at least partly the same light, for instance in relation to wavelength, polarization, etc.). However, this need not be the case in another embodiment; instead, a separate OCT light and work light can also be used. In specific embodiments, the effect that also objects outside of the actual measurement region can be mirrored in by a targeted undersampling can also be used in the OCT evaluation if need be.

In the case of a separate OCT beam and work beam, in addition to a coaxial OCT beam path and work beam path, use can also be made of an offset OCT beam or, for example, also an OCT beam directed to another point (e.g., on the back side) of the deflection unit. For instance, a broadband pilot beam can be input coupled (preferably in coaxial fashion) into a processing light in one embodiment, a scan deflection determination being implemented by means of said pilot beam according to the invention in one OCT method. Moreover, in the aforementioned embodiment, an OCT or coherence radar principle can also be used by means of the same OCT radiation of the deflection measurement, for example in order to use this to monitor or measure the processing procedure or the results thereof (particularly in in-line fashion).

BRIEF DESCRIPTION OF THE DRAWINGS

The method according to some aspect of the invention and the apparatus according to the invention are explained in more detail below in purely exemplary fashion on the basis of specific exemplary embodiments that are schematically illustrated in the drawings, with further advantages of the invention also being touched on. In detail:

FIG. 1a-1c show block diagrams of some exemplary embodiments of an OCT measurement;

FIG. 11a-11g show some embodiments according to the invention of examples of optical elements for embodiments of the present invention.

DETAILED DESCRIPTION

Figure 2A:
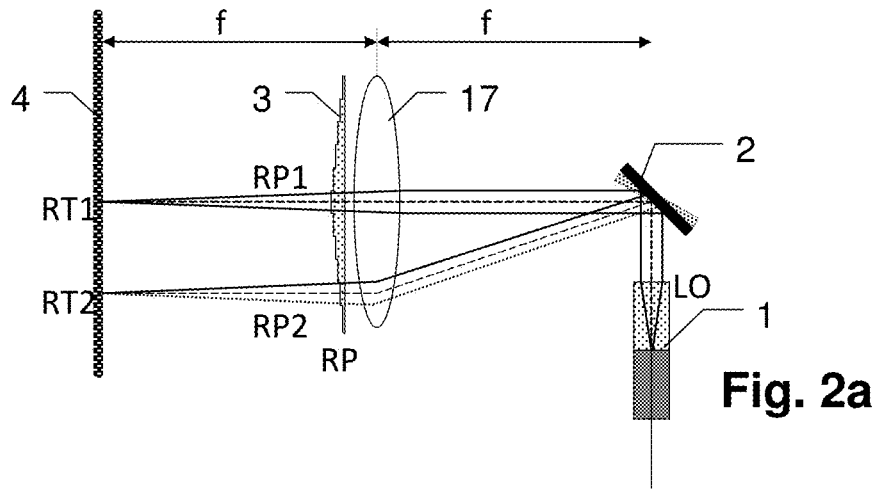
FIG. 2a shows a block diagram of a first embodiment for explaining how a deflection is determined according to the invention.

The representations in the figures only serve illustrative purposes and should not be considered exactly true to scale if nothing is explicitly specified. The same or functionally equivalent features have been provided with the same reference sign throughout, to the extent that it is practical, and these are distinguished by a letter as an index where necessary. The illustrated schemes each show the technical basic structure, which can be complemented or modified by a person skilled in the art according to general basic principles.

FIG. 1a schematically shows a possible example of an embodiment of an OCT measurement 1, which is usable in a deflection determination according to the invention. Here, the radiation of a low-coherent light source 10 (LCS) is directed on the beam splitter 12 (BS) by way of a collimated optical unit 11 (collimation lens, COL) such that an interferometer is formed, with a reference arm to a reference mirror 13 (REF) and a measuring arm to a test object 4 (sample under test, SMP) which should be measured. Here, interference is captured at the detector 14 (DET) and said interference is processed by evaluation electronics 15 (EV), which provide OCT measurement results 16. By way of example, this is a photodetector 14 (such as a photodiode, pin diode, APD diode, SPAD, CCDs, etc., individually, in rows or in arrays, for instance), if need be with an upstream beam reducer optical unit, followed by electronic (analog and/or digital) amplification, filtering, demodulation, signal processing, analog/digital conversion, etc., by means of which an OCT measurement result (e.g., in the form of a tomogram, the raw data thereof, specific measurement values from the tomogram, etc.) is ascertained or calculated. To this end, a so-called Z-scan 18 is carried out in this example, by means of which the length of the reference arm is variable and hence a longitudinal tomogram is ascertainable.

A beam deflection unit 2 (SCAN), which is embodied in the form of a controllably movable deflection mirror in the shown example, is situated in the measuring arm, upstream of the objective 17 (OBJ) in the shown example. The beam path of the measuring arm of the OCT measurement 1 can be moved laterally on the test object 4 using this beam deflection unit, as a result of which it is not only a single point but also a path or an area on the surface of the object 4 that is capturable by means of the OCT measurement, or the individual point can be displaced laterally on the object. Here, the beam deflection unit can be embodied for a one-dimensional or two-dimensional angle or lateral deflection of the beam path over the objects 4. Using this, it is possible, for example, to ascertain a tomogram 16 of a cross-sectional area with a depth of a few millimeters in the case of a resolution in the micrometer range.

FIG. 1b shows another exemplary embodiment of an OCT measurement 1 in a schematic illustration. Here, a fiber interferometer, which is fed by a spectrally tunable light source 10b (swept source or tunable laser, SS), is formed with the beam splitter 12 (BS). In this case, the length of the reference arm 13 (REF) can be fixed; instead, the emission wavelength of the light source 10b is tuned, as symbolized in diagram 18b. The detector 14 converts the interference arising into an electrical signal, which is processed by the evaluation unit 15 (e.g., a digital and/analog signal processor) such that a tomogram information item is ascertained in the longitudinal direction of the measurement radiation on the test object 4. Here, too, a beam deflection unit 2 is present once again for the lateral position or angle deflection of the measurement radiation on the test object 4 (SMP), wherein other embodiments of beam deflection devices 2 (SCAN) can generally also be used in addition to the above-described deflection mirror.

FIG. 1c shows a further example of an embodiment of an OCT measurement 1, which is likewise embodied with a fiber interferometer 12 (BS) and a fixed reference arm 13. Here, use is made of a broadband light source 10c LCS, as is symbolized by diagram 18c. Here, too, the beam path of the OCT measurement 1 is influenced by the beam deflection unit 2 again, wherein embodiments in which the OCT measurement is primarily or only used to ascertain, according to the invention, a current value of the deflection of the deflection unit 2 instead of measuring a test object 4 (SMP) by means of OCT as shown, are by all means also intended to be included. By way of example, further work radiation of another optical device could also be deflected by the deflection unit in the process, for instance additional measurement, illumination or processing radiation, etc. The OCT evaluation 15, 16 is implemented by a spectral evaluation of the interferometry on the part of the detector 14 in this example; this is often referred to as Fourier domain OCT. By way of example, use is made of a spectrometer, such as, for instance, a diffractive element 18c (diffraction grating, DG) shown here in exemplary fashion and a camera or line sensor 14, or other known methods for spectral evaluation of optical radiation.

Here, in some embodiments, an OCT evaluation can be implemented not only according to the conventional approaches but also by using an artificial intelligence (AI) system, which is embodied with an appropriate constitution and trained on the basis of such measurements. By way of example, an OCT evaluation may comprise a neural network in this case, the latter being trained on the basis of an evaluation of OCT tomograms (or the raw data on which these are based), specifically, for example, on the basis of determining longitudinal locations of reflections, even in the case of a multiple target measurement. Using this, it is possible, for example, to implement an automatic identification and/or an automatic classification of reflections of the OCT measurement, and the geometric locations thereof are ascertained (or the lateral scanning location derived therefrom according to the invention, or a 3D location of measurement points on the test object resulting therefrom).

Thus, such OCT measurements are accordingly embodied so that a tomogram or depth image is capturable therewith in the longitudinal direction along the beam path, wherein, with a deflection unit, a cross-sectional area or, in the case of a two-dimensional deflection unit, a volume is also capturable in the case of a lateral deflection of the beam path. Here, (even very low intensity) back-reflections or back-scatterings of the measurement radiation in the longitudinal direction of propagation of the measurement radiation are capturable by way of the measurement, said back-reflections or back-scatterings occurring at interfaces of different materials and/or different refractive indices, for example. Depending on the transmissivity for the measurement radiation, significant measurement depths in the beam direction can by all means be captured in the process, in particular in comparison with the obtainable depth resolution in the range of micrometers or even therebelow.

The aforementioned examples of OCT measurements 1 only serve here for visualizing some of the most common OCT measurement principles and neither should these be considered to be exhaustive nor should this exclude per se variants not explicitly shown here, in particular known variants, modifications and developments of OCT measurements. In principle, the present invention can also be applied in analogous fashion to embodiments with general electromagnetic radiation, where necessary also outside of the optical wavelength range.

FIG. 2a shows a detailed view of an example of an embodiment of a beam deflection unit 2. In addition to other, usually quite exotic approaches for beam deflection, the principle of a moving optical element, in particular a moving reflection area for the optical radiation, is one of the most frequently applied principles for deflecting beams in optical systems; however, the present invention is not necessarily restricted to beam deflections by moving mirrors but is also applicable to other beam deflection principles. In particular, tilting and/or rotating a mirror, for instance in the form of a galvanometer equipped with a mirror, is often applied. Within the scope of ongoing miniaturization of systems, however, use is also made ever more frequently of micromechanical systems, so-called MEMS (microelectromechanical systems), in particular also because higher dynamics and limit frequencies, for instance, are also obtainable therewith as a result of the lower mass, in addition to a miniaturization of the installation size.

These days, compact MEM mirrors facilitate the deflection of the light propagation at relatively high frequencies (up into the kHz range) in one or two angle directions. However, what is problematic here is that knowledge about the actual angle position as a function of time is usually missing, even though this is of quintessential importance for precise metrology, for example. As a rule, pure knowledge of the actuation signals does not suffice to determine the current, actual angle position since deviations may occur between the intended and actual positions of the time-varying mirror positions, in practice in particular on account of latencies, hysteresis, nonlinearities, dynamic behavior, natural frequencies, temperature dependencies, etc. A pure mirror position control, for example with forming a model, observers, lookup tables, etc., often does not lead to a satisfactory, sufficiently accurate, stable and reproducible result. Additionally, a preceding calibration of the mirror progress, e.g., on the basis of a known object, only has restricted validity and helpfulness, in particular because of the usually complex multidimensional parameter dependency of the angle positions.

Particularly in the case of MEMS beam deflectors 2, conventional position encoders are hardly avertable for the deflection on account of the small installation size and small deflections and correspondingly high position resolution approaches. Additionally, the present invention can be used for alternative beam deflection approaches without movable parts.

Therefore, a method and an apparatus are proposed according to the invention, which allow capture of a deflection position of a deflection unit 2 for light. In particular, the solution according to the invention can often also be used without undertaking modifications on the deflection unit 2 per se, which simplifies the integrability thereof in systems, the miniaturizability, etc.

Now, according to the invention, optical coherence tomography (OCT), explained at the outset, offers the option of being able to measure simultaneously a plurality of distances of partly transmissive objects along the beam path. This is applied in a known manner in order to create tomograms of partly transmissive test objects.

Now, according to the invention, a combination of a deflection unit 2 for light beams (e.g., with a moving MEM or conventional mirror) and an OCT measuring method 1 is provided. According to the invention, a deflection angle-dependent distance can be used here for returning the mirror position. Here, this can be implemented by a transmitting optical element in the deflected beam path, said optical element having a different length property in the beam direction depending on the deflection site, which is ascertainable by means of OCT. By way of example, a site-dependent length element 3 can be introduced in the deflected beam path to this end, or else an available element 3 with such a property can be used. Here, a back-reflection or a back-scattering of the OCT radiation along the beam path, back into the interferometer, can serve specifically as an optical property. Such a back-reflection, which is determinable by means of the OCT measuring principle, can be, for example, in the form of backscattering (which is usually low intensity, i.e., equaling approximately a percentage of the emitted radiation or often lying even considerably therebelow) or reflection at an object (specifically also an at least partly transmitting or in particular substantially transmitting object) along the beam path of the OCT measurement radiation, which, e.g., occurs multiple times at interfaces between media with different refractive indices. However, a component of diffuse reflection or scattering, cast back in the direction of the light source, may also constitute such a back-reflection, for example.

The length property in the beam direction, ascertainable by means of OCT, may in this case specifically define an optical distance, wherein, to this end, the refractive index n of the medium or media (e.g., air or glass) situated in the beam path can additionally be taken into account. Here, the optical distance can specifically thus not only be a geometric distance L to the site of an OCT return reflection but specifically also the geometric distance L (geometric spacing) divided by the refractive index of the intermediate medium (L/n). Consequently, the optical distance differs from the geometric distance as a function of the refractive index n of the intermediate medium or of the plurality of intermediate media (e.g., air and glass) present—consequently, the geometric distance of the optical component may optionally also stay the same laterally, for example, but the refractive index may differ in the lateral direction—or the two options can be realized.

For the purposes of explaining the invention, FIG. 2a shows an exemplary embodiment of a setup in which collimated light from a fiber collimator 1 is deflected by way of a deflection unit 2, for example even a tiny MEM mirror. Depending on the extent of the deflection, the light passes through different regions in the OCT reflection plate 3 (RP)—introduced as part of the embodiment of this invention. In one embodiment of this OCT reflection plate 3, the latter has, e.g., an antireflection coating (AR) on one side—however, its second surface produces a back-reflection, e.g. a typical 4% reflection, as a result of the glass-air transition.

Depending on the deflection position of the mirror 2, optical paths of different lengths are passed through in the shown OCT reflection plate 3 RP before some of the OCT measurement light (e.g., said 4%) is reflected back. In one variant of this embodiment with a telecentric setup, the region around the chief ray, in particular, is coupled back into the optical fiber 1 of the OCT interferometer. However, other variants for the further use of the chief ray are also possible, depending on application.

In another, specific embodiment which is likewise indicated in FIG. 2a in exemplary fashion, a common-path interferometry setup may also be formed, e.g., with a local oscillator (LO), which uses a reflection of an optical area in the optical unit. By way of example, use can be made of such a reflection in the fiber collimator 1 shown here; however, any other optical component in the beam path may also be embodied in this way to form a common-path interferometry setup. This allows the physical embodiment of a separate reference arm of the interferometer to be dispensed with, which may bring further advantages in terms of set up and application.

Figure 2B:
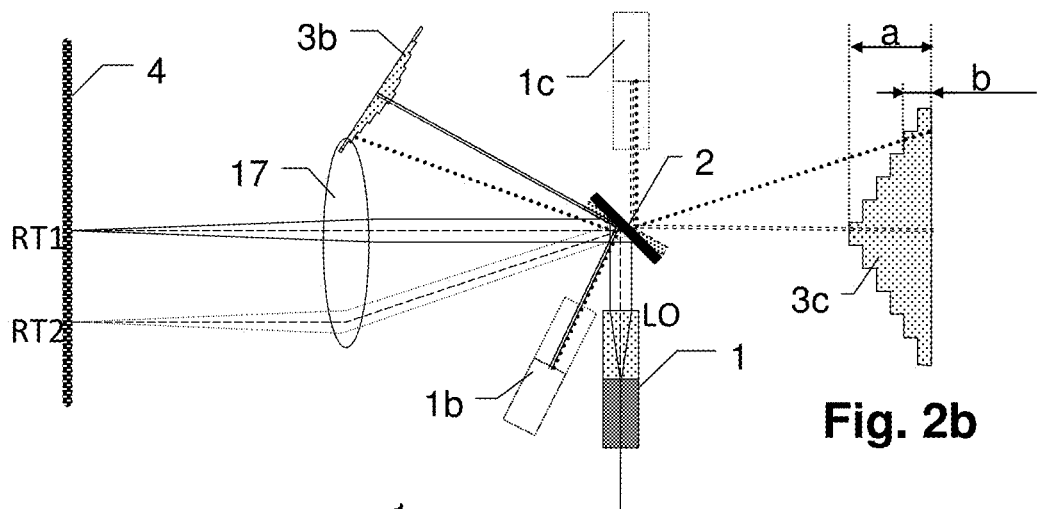
FIG. 2b and FIG. 2c show some examples of other embodiments of the present invention.

FIG. 2b shows specific alternative embodiments and variants of the invention. In one embodiment, an element such as the optical unit 17 that is required in the beam path in any case is embodied as element 3, by means of which a value of the angle deflection of the beam path is ascertainable by the deflection unit 2, i.e., a movable micromechanical mirror, for example. Here, such an embodiment of the element that is required in the beam path in any case can be implemented, in particular, in such a way that the latter causes (weak) back-reflections or back-scatterings of the OCT radiation back into the OCT interferometer, said back-reflections or back-scatterings being formed in such a way that these, at their longitudinal position along the beam path, yield different measurement values of the OCT measuring device in the case of different deflections by the deflection unit. On the basis of a relationship, preferably a known relationship, between the longitudinal position of the back-reflections and the deflections of the deflection unit, it is consequently possible, according to the invention, to ascertain a value of the (angle or position) deflection of the deflection unit by means of an OCT measurement.

In the two other embodiments likewise shown in the same figure, the OCT measurement 1b, 1c implemented for ascertaining the deflection, without the same OCT measurement radiation being used for measuring a test object 4. Here, once again, the OCT measurement radiation influenced by the deflection unit is steered on an optical element 3b or 3c at different lateral positions, said lateral positions, from the view of the OCT measurement, having different sites of back-reflections in terms of their longitudinal location. In the OCT measurement 1b, this is the optical element 3b with a beam path that is offset from actual work radiation, for which the deflection unit 2 is primarily provided. By way of example, a different part of the deflection unit 2 is used in the OCT measurement 1c, for instance the backside thereof in the shown example. Then, the associated optical element 3c can have a respective back-reflection at two points along the deflected beam path, for example, on the basis of the longitudinal spacing difference (e.g., the distances "a" and "b") of which a deflection angle value of the deflection unit can be derived. Here, the shown, stepped optical elements 3b and 3c can be considered symbolic and may also have different geometric embodiments provided the latter have different longitudinal distance measurement values of at least one OCT measurable back-reflection for the deflected OCT measurement beam, said longitudinal distance measurement values having a dependence on the angle and/or position deflection of the deflection unit. If, in a preferred embodiment, the same OCT measurement radiation is also used for a measurement on a test object 4, the optical element is transmitted (or passed, penetrated or reflected) by a substantial component of the OCT measurement radiation (i.e., more than half, preferably more than 80% or 90% of the measurement radiation).

Expressed differently, one or more distance or spacing measurement values, for example, can be captured—in another exemplary embodiment—by means of an OCT measuring method 1, a value of a deflection by a beam deflection unit 2 being ascertainable from said measurement value. Here, the OCT measuring method 1 specifically determines the value of a longitudinal distance or spacing dimension at an optical element 3, in particular a transmitted optical element, along the beam path of the OCT radiation. The longitudinal distance or spacing dimension may be determined in this case, in particular, at an interface of the optical element 3 (or else optionally between two interfaces of one or two optical elements), said interfaces within the meaning of the invention being characterized in that these have such an embodiment that they bring about an at least partial back-reflection of the OCT radiation, preferably a low back-reflection of backscatter, for example lying in the one-digit percent range or therebelow in terms of the intensity thereof. Consequently, the deflection angle is determinable by way of a (preferably unique) deflection angle-dependent form of the longitudinal distance information item on the back-reflection along the beam path. Here, the longitudinal distance information item can be determined, specifically, on the basis of the OCT method with an axial white light or low-coherence interferogram, for example, using a broadband or tunable beam source, a Michelson interferometer, a sensor element with spectral and/or spatial resolution, and a corresponding OCT evaluation unit. By way of example, optical path information items of partial light-reflecting structures of the optical element, specifically, are ascertainable here as an axial depth profile. A (preferably known) dependence of an axial path information item on the deflection angle consequently makes the current deflection of the deflection unit determinable according to the invention.

In one embodiment of a measuring method, the same OCT radiation optionally can be used here as both measurement radiation for determining the deflection and as work radiation for measuring a test object (for example, likewise by means of OCT—but optionally by means of another optical measuring method, too). In another embodiment, however, different radiations may also be used, respectively, as work radiation for measuring the object and as measurement radiation for determining the OCT deflection, either in coaxial or multi-axial fashion.

In another embodiment, the work radiation, in this case, can be not only embodied for measuring an object 4 but can also be embodied for processing, exposing or illuminating the object 4 or for a targeted light projection on the object 4. Here, too, the same radiation can be used as work and OCT deflection measurement radiation or a different optical radiation can be applied in each case, with an at least partly coaxial or else multi-axial beam path, depending on the embodiment.

Figure 2C:
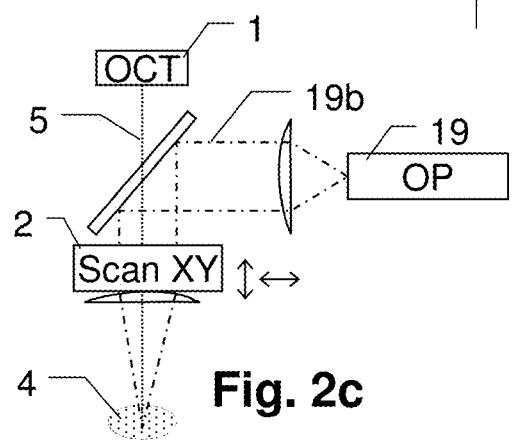

FIG. 2c shows an example of a coaxial use of a work radiation 19b and the OCT measurement radiation 5. Optionally, in this case, the OCT measurement radiation 5 of the OCT measuring device 1 can be used not only for the determination according to the invention of the deflection of the deflection unit 2 on the basis of the optical element but also for carrying out a measurement at (or next to) the point on the object 4 processed by a work radiation 19b of a work light source 19 (for example, a material processing radiation of a power laser 19 as operating light OP). Exemplary applications include measurement of a material ablation on the object 4, verification or finding of an object position on the basis of an OCT surface measurement or OCT tomogram measurement of the object surface; it may also be used for a targeted retrieval of structures to be processed on the object 4 (e.g., specific biological structures at or under the object surface), etc.

FIG. 3 once again resorts to the aforementioned example of a telecentric scanner construction with a variable retardation plate from FIG. 2a. Here, at least two distance signals arise in the tomogram of the OCT measurement signal shown, said distance signals occurring depending on the angle position of the beam deflection of the mirror at different distances, as shown in exemplary fashion for two angle positions in FIG. 2a, at which the points RT1 and RT2, respectively, are targeted on the target object 4. In the simple telecentric construction shown in FIG. 2a, the formula $y(t) \approx f_{lens} \cdot \theta_{MEM}(t)$ can be used in a paraxial approximation for the purposes of determining the lateral position y(t) on the target object 4 (reflection target, RT).

Now, the angle is encoded by way of the position of the reflection yRP on the optical element 3 (RP). In the case of a known profile of RP, the latter can be determined as $y_{RP} = \text{profile}_{RP}(z_{RP})$ from $\theta_{MEM}(t) \cdot f_{lens} = y_{RP}(t)$.

Here, the figure illustrates an OCT measurement, as may result, for instance, in the example of FIG. 2a, in a 2D diagram 30 as an example of a tomogram. Using the OCT measurement, a site or location information item of at least one back-reflection of the OCT measurement radiation situated longitudinally along the beam direction is determined, with reflection here, within the meaning of an OCT measurement, not meaning a mirror reflection of approximately 100% but a few percent or less (e.g., less than 10% or less than 5% or in the region of 1% or, in some embodiments, even less than 1% of the emitted OCT measurement radiation) of the measurement radiation backscattering—as occurs, for example quite frequently, at boundary layers between different media or layers with different optical properties (such as the refractive index, etc.), or contaminations, etc.

Specifically, it is possible in the process to determine a relative relationship of two site information items, i.e., a longitudinal distance between two reflections, for example as a distance between two interfaces or layers at an optical component in the beam path of the OCT measurement light. In another embodiment, it is also possible to determine a spacing between different optical components. In yet another embodiment, it is also possible to determine a site information item in absolute terms, i.e., for instance, in relation to an interferometer reference arm.

Figure 3:
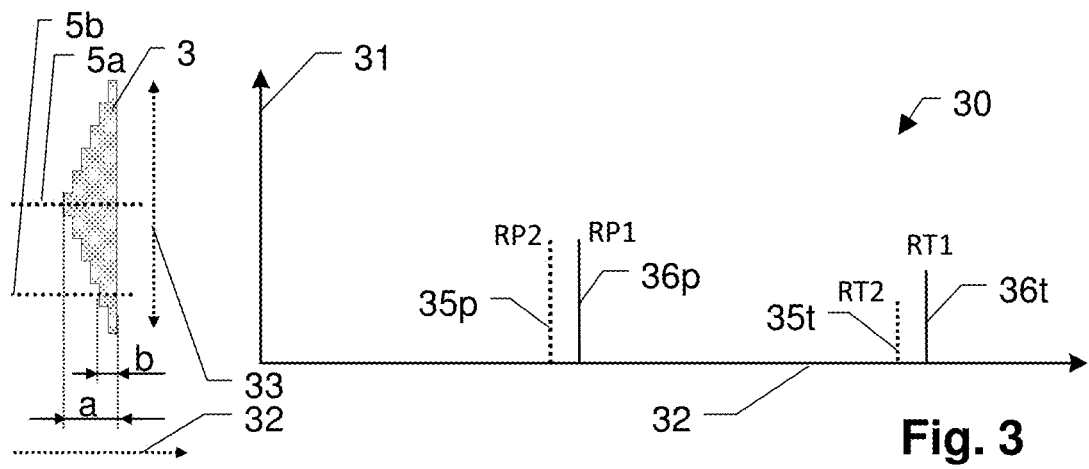
FIG. 3 shows an example of a tomogram in a system according to the invention.

Here, in FIG. 3, the abscissa 32 plots the longitudinal location or distance (along the beam path) of the back-reflections RT1 36t and RT2 35t from the test object 4, illustrated in the case of different beam deflections 36a and 35a of the beam deflection unit 2—and consequently at different lateral positions RT1 36t and RT2 35t of the radiation on the measurement target 4. Likewise, the back-reflections RP1 36p and RP2 35p at the optical element 3, also referred to as reflector plate RP here, in the beam path are shown.

The ordinate 31 plots the back-reflections, in each case in terms of their intensity.

An example of an optical element 3, which is similar to the reflection plate RP in FIG. 2a, is illustrated, once again, to the left of the diagram 30. This shows the beam path in a first lateral angle or position deflection 36a by the deflection unit 2 in the lateral direction 32, which is related to the OCT measurement 36p in the diagram 30, and in which a longitudinal dimension "a" of the optical element 3 prevails in the beam path. By way of the OCT measurement 35p in the diagram, the beam path is related in a second lateral angle or position deflection 35a by the deflection unit 2 in the lateral direction 32, in which a longitudinal dimension "b" of the optical element 3 prevails in the beam path.

Figure 4A:
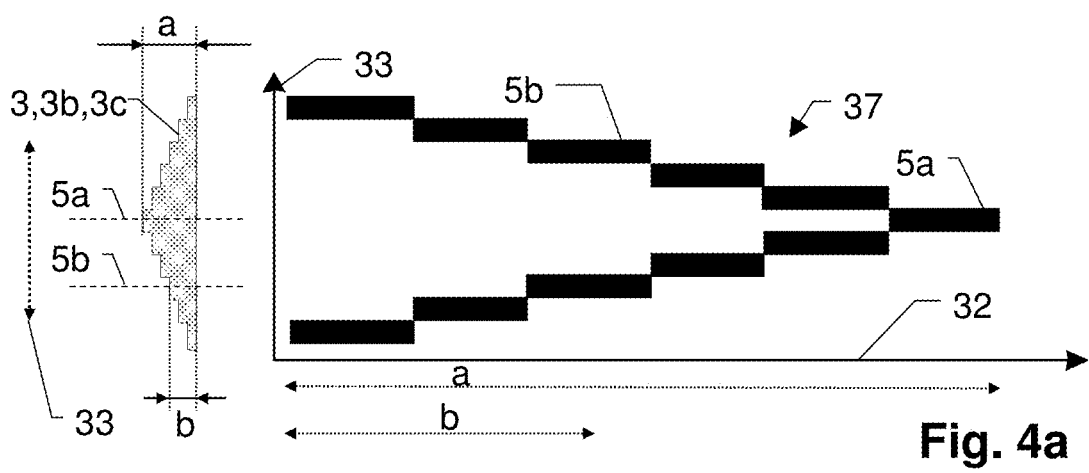
FIG. 4a shows a first example for explaining an embodiment of a deflection determination according to the invention.

An example of how the deflection angle of the deflection unit 2 can be encoded by way of the position of the reflection yRP on the optical element 3 (RP) in the case of a known geometric profile of the back-reflections of RP is shown in FIG. 4a. It illustrates an encoding of the lateral position yRP over zRP in diagram 37. Here, the abscissa 32 shows values of the deflection of the deflection unit 2 and examples of respective lateral locations of the back-reflections in the beam path are plotted on the determinant 33. In this example, there is a back-reflection respectively at the entrance and at the exit of the beam path into and from the optical element 3. Shown here is an embodiment with discrete steps of the longitudinal locations of the back-reflections, as occur, for example, in the case of a reflection plate similar to that in FIG. 2a, wherein the respectively associated lateral or angle deflection can be read from the abscissa.

Here, the design of the optical element 3 used in exemplary fashion here yields the relationship between the distance zRP on the abscissa 32 of FIG. 4a and the lateral location yRP on the optical element 3 on the ordinate 33. As shown in exemplary fashion in FIG. 3, this relationship in the shown (simplified) case corresponds to the lateral location of the beam on the target object 4 straightaway—said location intending to be determined as actual position deflection of the beam deflection unit 2. Formally, this can be expressed by $$y_{target}(t) = f_{lens} \cdot \frac{y_{RP}(t)}{f_{lens}} = \text{profile}_{RP}(z_{RP}(t)),$$

by for example.

When measuring the target object 4 with the same OCT radiation, it also needs to be observed that the change in distance at different deflection angles of the deflection unit 2 between the values at RP1 and RP2 at the same time also adds to the position of the target RT1 and RT2. However, this can subsequently be eliminated in simple fashion by an appropriate subtraction of the known profile of the optical element 3.

As a result, an evaluation of back-reflections of the optical element 3 in each OCT measurement allows a real-time determination of the actual angle position of the deflection mirror during this measurement.

An example of an embodiment with discrete steps of the optical element 3 is shown to the left in FIG. 4a. The lateral location 32 of the non-deflected beam path at 5a in this case yields the longitudinal path "a" between an entrance back-reflection and exit back-reflection of the optical element 3d the beam path yields the path "b" in the case of the deflected beam path 5b. These paths are respectively specified in diagram 37 in exemplary fashion, where a curve of a longitudinal location of the back-reflections is reproduced in the case of the lateral displacement; this forms an easily understandable variant of encoding/decoding the lateral deflection location in the longitudinal light propagation direction. Here, other embodiments can form correspondingly different encodings, in particular also more complex encodings, although these are not illustrated here for reasons of clarity. Specifically, the ambiguity of the deflection in the up or down direction, which occurs in the shown embodiment, can be avoided by an appropriately unique encoding, for example; the encoding can be implemented in two-dimensional fashion, the encoding can be implemented as a multi-value binary encoding with a plurality of longitudinal reflexes, the encoding can be implemented in analog fashion, etc.

Figure 4B:
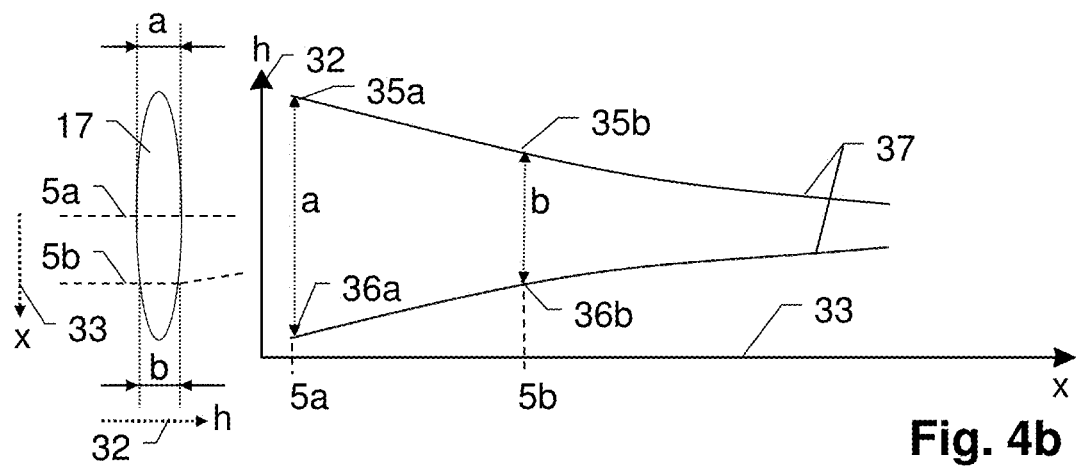
FIG. 4b shows a second example for explaining an embodiment of a deflection determination according to the invention.

FIG. 4b is a variant similar to that of FIG. 4a. However, the optical element 3 is embodied in the form of a lens in this case. Shown on the left is an example of an alternative embodiment to the discrete steps of the optical element 3 in the left of FIG. 4a, this example exhibiting a continuously changing transmitted optical element 3 in the beam path. By way of example, the latter can be embodied in the form of a lens 17, for instance. The lateral location x 33 of the non-deflected beam path at 5*a* in this case yields the longitudinal path "a" between an entrance and an exit back-reflection of the optical element 17 in the direction h 32; the path "b" emerges in the case of the deflected beam path 5*b*. These paths are respectively specified in the diagram in exemplary fashion, with the diagram in this case having a continuous curve of the upper and lower boundary lines 37 in accordance with a continuous deflection variation, for example in the form of a lower and/or upper straight line or curve 37 reproducing a curve of a longitudinal location h 32 of the back-reflections in the case of a lateral displacement x 33—this reflects the geometric form of the lenses 17. On the basis of the longitudinal relative locations a, b of the entrance reflections 35*a*/35*b* with respect to those of the exit reflections 36*a*/36*b* at the element 17, determined in the direction h 32 by means of an OCT, it is consequently possible to determine the respectively associated lateral location x of the deflection of the measurement radiation 5*a*/5*b*. In the case of a symmetrically embodied element 3, 17, it is optionally also possible to use, for example, a center between the reflections 35 and 36, which characterizes the lens plane 17, for example, as a reference (in particular as an absolute reference) for a measurement distance. Depending on the embodiment, one or more other reflections can also be used as a reference.

In a development embodiment of the invention, it would also be possible, for example, to evaluate the longitudinal location of (weak partial) reflections at components, interfaces, optical elements, etc., of the measuring device in order to determine, and facilitate the compensation of, further effects, sources of errors or deviations. By way of example, changes in temperature can be deduced using a (relative) evaluation of a reflection at a start and at an end of a measuring probe or measuring stylus, within the scope of which the measuring probe or the measuring stylus expands accordingly, in particular wherein these expansions then can also be compensated in the measurement results. Analogously, other influences such as deformation, aging, wear, contamination can also be ascertained accordingly using this extended aspect of the invention. In the case of an appropriate design and embodiment of the interferometer arrangement, it is possible, here, to also map or convolve a plurality of reflections in a measurement region of the interferometer, for example, in order to determine a plurality of relative and/or absolute locations of the reflections using a single measurement, i.e., for example, in a single tomogram.

Thus, at least two back-reflections that are evaluable relative to one another are captured at at least one optical element 3 in each case in some embodiments according to the invention, as a result of which some sources of error may possibly be avoided in relation to an absolute evaluation. However, an evaluation of only one lateral position-dependent back-reflection location is also performable in the longitudinal direction according to the invention, the lateral deflection being determinable on the basis thereof. Alternatively, a plurality of back-reflections and/or a plurality of optical elements 3 may also be evaluated.

Specifically, if need be, optical elements 17, 2, 39, etc. that are present in the beam path in any case, or the back-reflections thereof, can also be used in addition to an optical component 3 explicitly introduced for this purpose. Here, an OCT measurement within the meaning of the present invention can be formed in a specific embodiment in such a way that both the optical element 3 and the object 4 are measurable therewith. In another embodiment, an interferometer device of the OCT measurement can be embodied in such a way that the former forms a plurality of reference arms, by means of which, firstly, a distance range in the region of the optical element 3 in dedicated fashion and, secondly, another distance range in the region of the object are measurable, preferably at the same time. In one embodiment, the OCT measurement may alternatively also form a plurality of interferometer devices dedicated to this end.

Expressed differently, the optical path is embodied in such a way according to the present invention that a change in the longitudinal location or site information item or a change in the longitudinal distance changes with a change in the beam deflection. Here, in one embodiment, there can be absolute, unique assignment of a value of the deflection to a site information item or to a distance. In another embodiment, it is possible, in a yet other embodiment, for a plurality of different site information items or distances also to be determined by means of the same measurement radiation—for example, in order thereby to resolve ambiguities of the when determining the deflection, to obtain a specific (e.g., multi-channel) deflection encoding or, in the case of a multi-axis beam deflection, to capture a plurality of separate changes (respectively assigned to the deflection axes, in particular) in the longitudinal site information items, too. In another embodiment, the optical element can also be embodied in such a way that the latter has a layer construction in the beam passage direction, the longitudinal direction, which is configured in such a way that it has different encodings by means of the layer construction in each case depending on the lateral position on the optical element. In an exemplary embodiment, a binary encoding, for instance, can be formed by means of a reflective layer region (=logical 1) or a non-reflective layer region (=logical 0) of a respective lateral region. A plurality of layers lying above one another and encoded differently in this way can therefore be evaluated via OCT to form a longitudinal codeword pattern of bright/dark regions in the depth image of the tomogram, by means of which the respective lateral positions can be uniquely encoded on the optical element. In addition to a layer-by-layer lamination of the optical element, such a code pattern can also be obtained in the optical element from a plurality of layers of differently reflecting, lateral regions, for example also by means of laser engraving, doping, etc. Since the reflectivity differences that are capturable via OCT may, by all means, lie in the region of percent or even significantly therebelow, the optical element (even in the presence of a plurality of code layers) may be considered to be substantially transparent, as a result of which, for example, the same OCT radiation, too, can also be used for measuring a test object.

In accordance with the comparatively high longitudinal spatial resolution of an OCT measurement, a change in a site information item or a distance or a coding, evaluated according to the invention, can be kept small in terms of its geometric dimensions, for example specifically also in a region below 10 mm or below 1 mm or, for instance, in the region of a few tenths, hundredths or thousandths millimeters.

Figure 5:
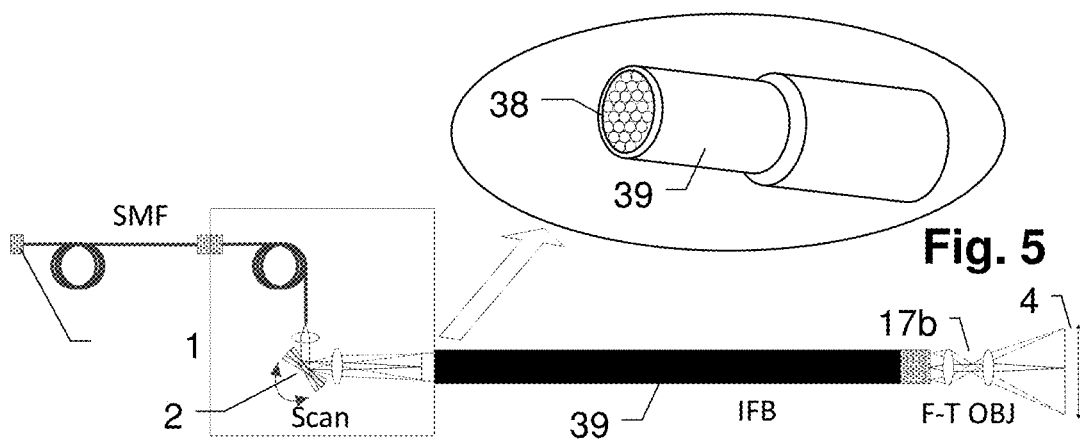
FIG. 5 shows an embodiment of the present invention with an optical light guide.

In the example of a specific embodiment of an application of the present invention, shown in FIG. 5, there can also be forwarding of the angle- or position-deflected light beam by way of a light guide 39—in addition to a direct further use of the deflected optical work radiation on the object 4 in the conventional sense. By way of example, the light guide 39 can also be embodied as a multi-dimensional light guide, for example in the form of an optical fiber bundle or as other embodiments of optical light guides 39. As a result, it is possible, for example in the case of an optical measurement sample with a scanning device, to spatially separate the deflection mechanism 2 and the associated electronics, etc., from the emission region in which the optical measurement at the test object is implemented by means of the deflected OCT radiation. Using this, it is possible, in particular, to keep the measuring end of the measurement sample small in terms of its dimensions and no mechanical and/or electrical connections are required at the end of the measurement sample. The sensing end of the measuring head can be reduced to the light guide 39 with, if necessary, an optical unit 17b at the end thereof in a minimal embodiment, for example. Here, the light guide 39 need not only have a rigid embodiment; instead, it may optionally even have a flexible embodiment. To this end, the light guide 39 can be housed in a measuring stylus or a measuring probe, for example, at the end of which a micro-optical unit 17b, for example an F-theta lens or similar, images the light guide end on a test object 4. Hence, the test object can be sensed by the OCT measuring device 1 by way of a variation of the deflection mirror position 2 at the end of the light guide 39 distant from the test object 4.

In a specific embodiment, an interferogram for the OCT measurement can also be produced by interference with the LO light field, which is reflected back at the end area, which has been polished to be plane, of the light guide 39 (IFB). Here, as it were, the light guide 39, or the end area(s) thereof, forms the optical element 3 of the deflection determination according to the invention.

Figures 6A, 6B:
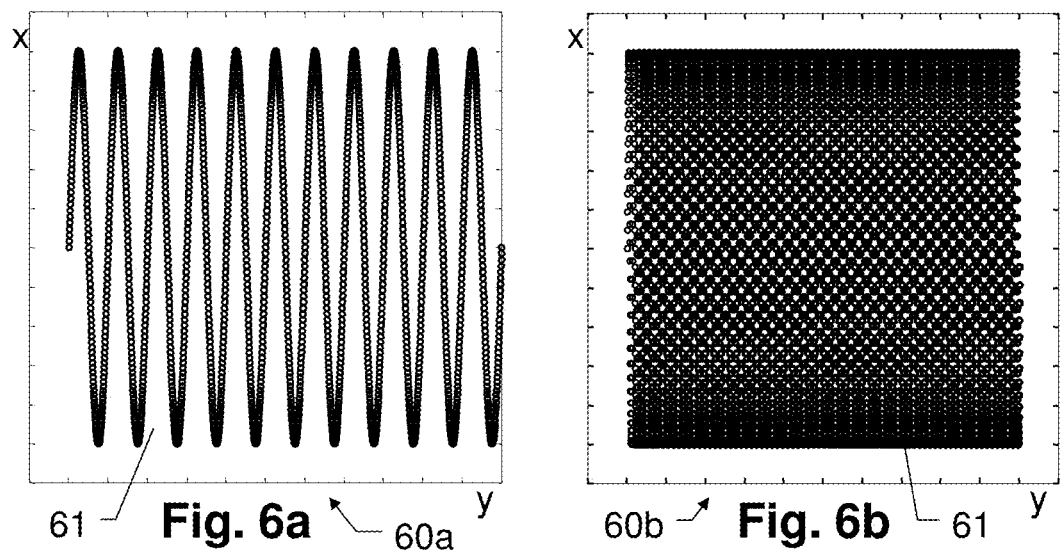
FIG. 6a and FIG. 6b show an illustration of exemplary scanning paths of an embodiment of the invention for a 3D object measurement.

FIG. 6a and FIG. 6b show two examples of scanning paths 60a and 60b on a test object in exemplary fashion, it being possible to obtain a 3D capture of a surface profile (and/or of a tomogram of at least partly transparent objects) therewith. Here, the scanning path is composed of a sequence of measurement points marked by circles 61 and 62, respectively. In accordance with the present invention, it is not only a distance value that is longitudinal in the measuring beam direction or a tomogram of this measuring point on the surface of the test object that is ascertainable at each measuring point on the surface; instead, it is also possible to ascertain the respectively associated, shown x- and y-coordinates of the lateral position of the measuring point on the test object. Thus, according to the invention, at least three dimensional coordinates can be ascertained for each of the measuring points with a high measuring accuracy and measuring rate since a movement of the deflection device can be implemented quickly and/or highly dynamically, in particular more quickly and dynamically than the axes of a coordinate measuring machine can be moved. Here, the shown paths 60a and 60b are examples by means of which surface profiles, for instance, can be measured.

In the shown examples, the extent of the deflection can be approximately +/−5 mm along each axis, for example. For instance, in the example of 60a, a deflection speed within the scope of the pendulum movement of the deflection unit in the y-direction of approximately 5 Hz and a deflection speed of the deflection unit in the x-direction of approximately 5 mm/s can be obtained in this case. For instance, in the example of 60b, a deflection speed within the scope of the pendulum movement of the deflection unit in the y-direction of approximately 15 Hz and a deflection speed of the deflection unit in the x-direction of approximately 2 mm/s can be obtained in this case. Here, in one embodiment, only one of the movements, preferably the faster movement, can be implemented by an optical deflection unit, in particular a one-dimensional optical deflection unit, for the measurement radiation instead of use being made of a two-dimensional optical deflection unit, and the other movement can be obtained by moving the optical probe head or a machine axis. Even in the case of these high (or even higher) speeds, the current location of a MEM deflection unit used here can be ascertained according to the invention for each of the measurement points, and said current location is not only determined by the actuation signals of the MEM deflection unit.

In addition to the shown examples of scanning paths 60a and 60b, which are primarily embodied to capture a 3D surface profile at a constant measuring rate, other scanning paths, in particular predetermined scanning paths, however, can also be driven by the deflection unit. In particular, a capture according to the invention of the current deflection of the deflection unit can be used here as an actual value for a position control loop for actuating the deflection unit.

Figure 7A:
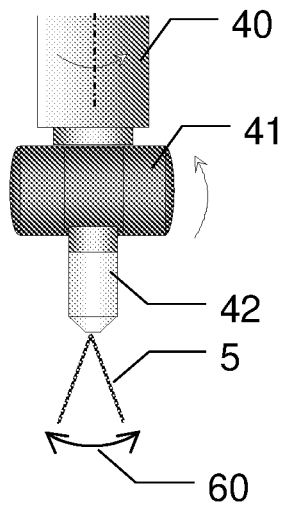
FIGS. 7a-7c show exemplary embodiments of measuring heads, embodied according to the invention, for a CMM.

FIG. 7a shows an example of an embodiment of a measuring head 42 for a measuring appliance which can be used for a contactless measurement of an object, within the scope of which the measurement radiation 5 is deflected by a beam deflection unit 2 or, expressed differently, scanned, as is indicated by the fan of beams of the measurement radiation 5 and the arrow 60.

In the example of this embodiment, the starting point for instance is an OCT sensor, embodied as a point sensor, on a CMM machine, the measuring field of said sensor being extended by the CMM from a point to a path or an area by way of the lateral movement of the OCT measuring probe. The measuring speed, achievable therewith, of the point cloud ascertained in the process is, however, low and primarily limited by the movement of the CMM machine. In order to improve such a measuring method or such a measuring machine, a transition is provided according to a first aspect of the invention to comparatively faster scanning 60, according to the invention, of the optical radiation by means of an optical deflection unit 2 (e.g., a moving scanning mirror, etc.).

However, even without scanning, a measurement of the test object covering the whole area where possible may be difficult or even impossible in the case of such a pointwise measuring mechanism on account of the often restricted spatial conditions, particularly in the case of test objects that are difficult to access. Since the limits of the construction volume of the measuring probe are already thus reached or exceeded in any case, an additional installation of a correspondingly positionally accurate optical deflection device 2 on the measuring tip of the measuring probe would hardly be possible—as a result of which an implementation of such a scanning mirror approach in a measuring head 42 of a CMM machine 40 appears hardly expedient or even doable. Positionally accurate galvanometers, usually used to this end, would be unsuitable or unsatisfactory to this end—even from other technical considerations—particularly with a correspondingly positionally accurate deflection control loop.

Due to the installation size, scanning OCT based on correspondingly small MEM mirrors as a beam deflection unit would still be possible, at best, in accordance with a further aspect of the invention. Here, a micromechanical mirror that is movable by electric actuation signals can be situated on the measuring head 42, for example. Here, this measuring head 42 can be attached, for example, to a movable shaft of a corresponding receptacle of a coordinate measuring machine 40. In addition to shafts that are movable in linear fashion, the latter can also have, e.g. rotation and/or pivot axes 41. Here, the actual optical measuring device can be housed, at least in part or else in full, in the measuring head 42; however, it may also be arranged (at least partly) externally thereto, with the measurement light being guided to the measuring head, for example by way of an optical fiber.

Figure 7B:
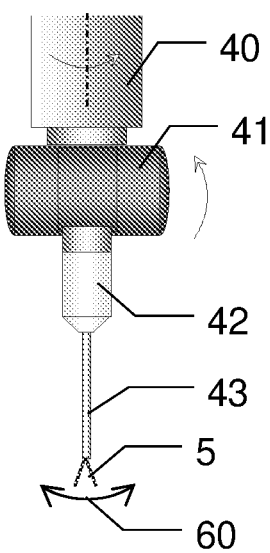

However, such an approach, on its own, would probably still not be sufficient in many cases of application since sufficiently accurate information items about the actual beam deflection of the deflection unit 2 are not known in the case of such MEM mirrors. The complex problem area set forth above can be solved, according to the invention, as already explained above, and so a sufficiently accurate information item about the actual deflection of the deflection unit—even of tiny MEM mirrors—is obtainable, particularly at the time when the test object is measured by OCT. An example to this end is shown in FIG. 7b, in which the measuring head 42 is embodied with an appropriate measuring stylus which, if need be, can also have an interchangeable configuration, for example for different lengths, forms, measuring directions, etc.

Since, as mentioned, a thin structure is sought-after in many cases for an OCT measuring probe in a CMM for the purposes of good accessibility to the test object, the aforementioned approach with an integration of a MEMS scanning mirror at the front end of the probe would even be very difficult from a technical point of view, however, and the results thereof would still not be satisfactory or optimal for numerous cases of application. In accordance with a developing aspect of the invention, an integration of the scanning device on the test object-distant side can be sought-after in the housing of the measuring probe 42 (or even outside of the actual measuring probe) in some embodiments; according to a further aspect of the invention, this is obtainable by means of an image fiber bundle (IFB, or else light guide) for example, the focal plane of the scanning device being transferred from a back end of the IFB to a front end of the IFB by means of said IFB. Here, an F-theta lens at the test object-side end of the fiber bundle can be used for example for the purposes of obtaining the desired measurement region.

Figure 7C:
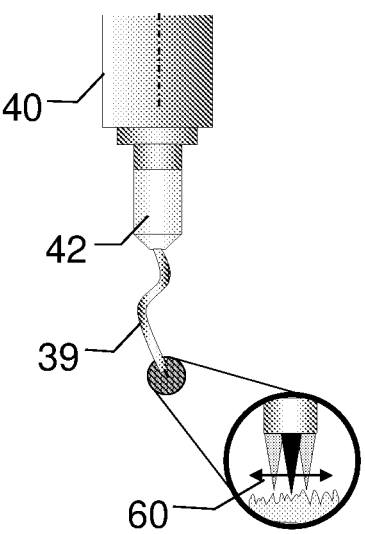

In a manner comparable to the specific embodiment shown in FIG. 5, a full area or line-by-line OCT measurement can be carried out, for example, at the distant test object 4 by the light guide 39 (=image fiber bundle—IFB). FIG. 7c shows an example of an embodiment of a light guide 39 as a measuring end of the measuring head 42 on the CMM 40, at the end of which a lateral scanning movement 60—in one or two dimensions, depending on the embodiment—of the measurement radiation can be carried out. The shown form of the light guide 39 should indicate that this may also have a flexible configuration in one embodiment; however, the latter can also have a rigid embodiment (e.g., similar to what is shown in FIG. 7b) in another embodiment. Here, the OCT measuring device 1 and/or the deflection unit 2 can be arranged either in the measuring head 42 or else externally thereof, e.g., by virtue of the light guide 39 being guided accordingly through the measuring machine.

Here, a precise localization of the lateral location at which the light is coupled into the IFB is necessary in the case of a very fast scanning speed, e.g., in the range of several kHz or thereabove. Here, knowledge of the lateral location is necessary with an accuracy corresponding to the IFB 39, which is usually comparatively high in accordance with the usual dimensions of light guides. Therefore, a correspondingly accurate angle encoder must also be integrated into the scanning device since only a scanning device provided with an angle encoder facilitates a full-area OCT measurement that is sufficiently accurate and thermally and mechanically stable.

In many applications, the scanner device for the beam deflection must have a two-dimensional embodiment in order to carry out a 3D scan on the object, as a result of which, accordingly, the measurement of the beam deflection by the angle encoder must also have 2-dimensional encoding.

The movement of the scanning mirror can run along different tracks. In principle, these tracks could be predetermined in defined fashion in a first variant such that the measurement radiation is guided along a predefined track, for example by a control loop in the scanner device; alternatively, said tracks need not be exactly predetermined in mandatory fashion in a second variant but also be carried out in randomized fashion for as long as the position thereof is known sufficiently accurately and reliably from the angle encoder at the measuring times, for example, by way of a one-axis or two-axis oscillation, for example also in a resonance of the deflection unit.

Here, the light guide 39 can have different arrangements and embodiments. By way of example, a linear or 1-dimensional form can be present at the input coupling side while the fibers of the output coupling side could be arranged in a round form. Here, an assignment between the input coupling position and the output coupling point at the other end of the light guide can also be calibrated in advance for example, and, for instance, be stored in an LUT (look-up table), particularly if this relationship is not strictly linear in the simplest form; this may occur, in particular, in the case of fiber bundles. If this assignment is known, the user is then able, for example, to select different output coupling forms over time or predefine paths, which are then driven according to the assignment by the deflection mirror on the input coupling side.

In this case, the retardation plate shown in FIG. 2a—or a correspondingly acting optical element 3—can be arranged, as a matter of principle, at any point at or downstream of the beam deflection in order to obtain a spatial distance-dependent back-reflection, which, according to the invention, can be appropriately evaluated by an OCT measurement in order to ascertain the deflection of the deflection unit 2 therefrom. Here, the retardation plate may optionally also be applied, for example, on the input or output coupling side of the light guide. In another embodiment according to the invention, the input and/or output coupling area of the light guide 39 can also be used, for example, to obtain this back-reflection for a determination of an OCT scanning deflection angle. By way of example, the fibers of the light guide 39 can have embodiments of different lengths or the input and/or output coupling area of the light guide 39 can have an embodiment with an appropriate geometric form.

Figure 8A:
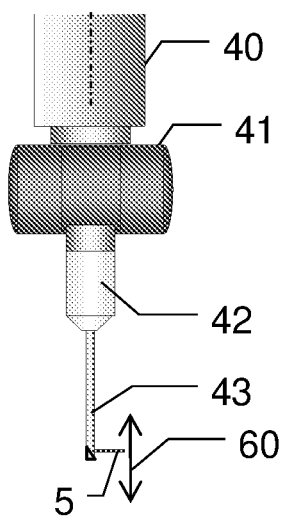
FIGS. 8a-8e show further exemplary embodiments of measuring heads, embodied according to the invention, for a CMM.

In another special embodiment of FIG. 8a, there can be an additional fixed beam deflection of the OCT measurement radiation 5 at the end of the optical unit of a measuring stylus 43 during an OCT measurement according to the invention, for instance by way of a prism or another optical element with a deflecting effect. Using such a fixed deflection at the output coupling point of the measurement radiation toward the test object, for example through 90°, there can also be a measurement around a corner in this case. Here, the scanning movement direction 60 is likewise deflected.

Figure 8B:
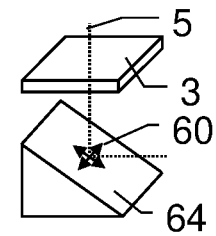

Here, FIG. 8b once again shows a schematic detailed view with a prism 64 for the 90° deflection of the measurement radiation 5 that is deflectable accordingly in the directions 60. According to the invention, a location 60 of the measurement radiation is also ascertainable in this case, by means of an OCT measurement of the optical element 3.

Figure 8C:
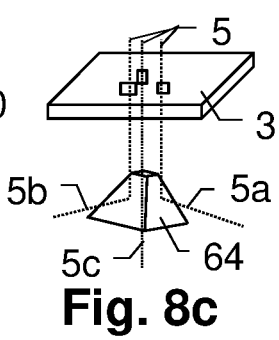

Completely novel measuring probe concepts can be realized here, especially in the interplay with the scanning device. By way of example, the measuring direction can be switched, for example between 0° (or orthogonal to the output coupling area in a scanning direction in the region 5a) and a measuring direction lying at 90° thereto in the region 5b, using one or more appropriately embodied prisms (or the like) which only cover part of the output coupling region that can be covered by the scanning device. Here, according to the invention, an exact distinction can be made between these directions if the deflection is known; i.e., it is possible to ascertain not only the deflection in the respective direction but also the direction per se. Here, the deflection determination according to the invention can be ascertained with the inclusion of back-reflections in or upstream of the input coupling region and also with the inclusion of back-reflections in the output coupling region, i.e., specifically, also with use of back-reflections at the deflection prism. The schematic detailed view of another example of an additional, fixed deflection 64 is illustrated in FIG. 8c. There, an optical deflection element 64 is embodied as a pyramidal frustum, for example. In accordance with the location of the deflection of the measurement radiation 5, ascertainable on the basis of OCT measurements of the element 3 as described, the measurement radiation 5 is emitted, e.g., in one of four directions 5a, 5b that are orthogonal to the stylus 43 in this case, as a result of which the stylus can optionally measure in four (or a correspondingly different number in the case of the polygonal embodiment of the pyramid-shaped mirrored deflection element 64) substantially orthogonal directions 5a, 5b (only two of these directions are visible here). Here, the direction can be selected by means of the scanning device. In the shown embodiment with a pyramid frustum, there can optionally also be an additional longitudinal measurement 5c, by virtue of the measurement radiation being aligned accordingly by the scanning unit.

In other embodiments, the deflection at the measuring stylus 43 can also be formed for directions that differ from 90°; specifically, the deflection can also be formed depending on the location 60, for example in order to realize different scanning regions, such as, for instance, a selectable measuring direction in a spherical arch, hemisphere or dome form, etc.

Figure 8D:
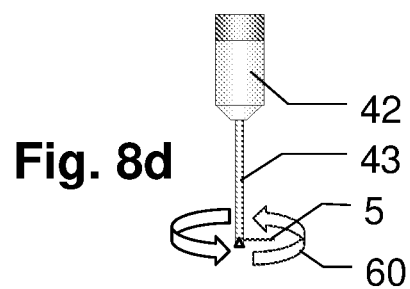
Figure 8E:
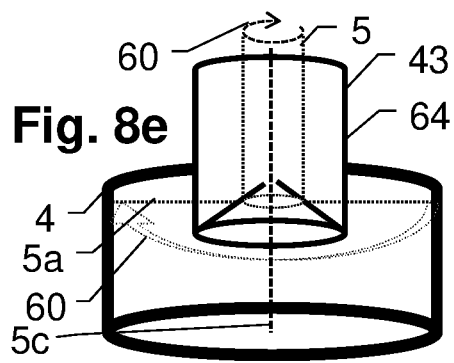

A scan can be implemented along a circular trajectory (optionally also in a fiber bundle) in combination with a conical beam deflection toward the test object 4 at the output coupling point in an exemplary embodiment of FIG. 8d and FIG. 8e. Using this, it is possible to form a ring-shaped 90° deflection of the measurement radiation 5 in order, for example, to measure inner pipes or bores as test objects 4. Here, the radial angle direction in which the measurement is currently carried out is known by way of an ascertainment of the location of the beam deflection according to the invention. In the shown example of FIG. 8e, a bore 4 is measured in its entirety along the circumference in its circular cross section. To this end, the scanner deflection can have a substantially circular embodiment, for example as indicated. Here, according to the invention, it is possible to ascertain an absolute or relative angle orientation of the recorded profile along the circumference using the OCT measurement of the scanner location according to the invention (and in accordance with a known or ascertainable geometric transformation of the fixed deflection 64).

If a deflection position is additionally provided at the output coupling area at which there is no (or a different) deflection (e.g., as shown that in the center, for instance in a rest position of the scanner, there is no deflection by the probe head tip 64, e.g., with a bore, a flattened tip, etc.), it is possible to determine both a cross-sectional profile over 5a and also a depth of a bore 4 (or any other depression) over 5c using a single measuring probe; by way of example, this can dispense with a probe head interchange.

Figure 9A:
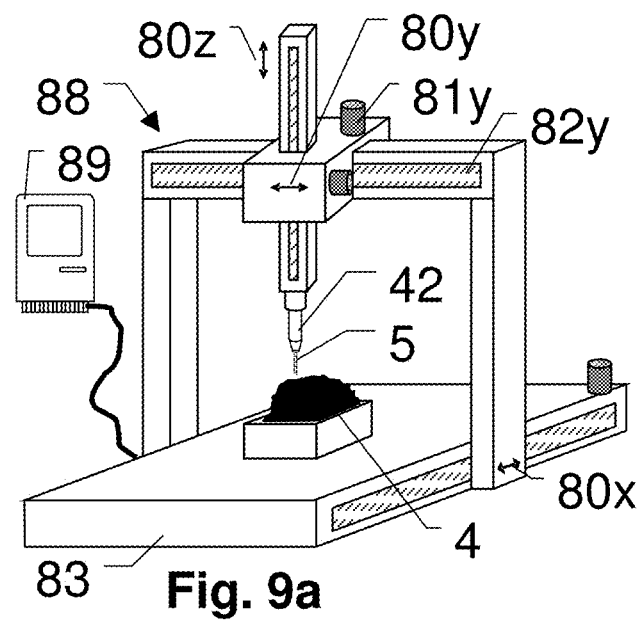
FIG. 9a and FIG. 9b show embodiments of examples of a CMM, in which use is made of a deflection determination according to the invention and/or of the aforementioned measuring heads.

FIG. 9a shows an example of a CMM 88 with an OCT-based measuring head 42, for example as described above, in which an optical deflection of the measurement radiation 5 is performable in one or two dimensions. Using this measurement radiation 5, it is possible to measure the object 4 on the measuring stage 83 in punctiform fashion, along a path or over an area, with at least some of the movement of the measurement radiation 5 being caused by an optical deflection unit for the measurement radiation 5. Here, the movement shafts 80x, 80y and 80z can preferably be equipped with a respective drive (e.g., 81y) and a position measuring device (e.g., 82y). An evaluation unit 89, e.g., a digital computer or a measuring machine controller, is embodied in such a way here that the object 4 is measured in terms of its geometry and/or other physical properties by means of the CMM 88, preferably in at least partly automated fashion.

Specifically, there can be a three-dimensional measurement of a surface of the object 4 in the process. According to the invention, this can be implemented with lateral or angular scanning of optical measurement radiation by way of a deflection unit, at least for respective portions of the surface, wherein the location or direction of the scanned radiation is implemented by means of an OCT measurement in the longitudinal direction along the measurement radiation at an optical element in the beam path. Specifically, the optical element can have a corresponding embodiment here in such a way that the latter has a back-reflection that depends (in particular uniquely depends) on the lateral or angular deflection, said back-reflection leading to distinguishable results in the longitudinal OCT measurement.

Figure 9B:
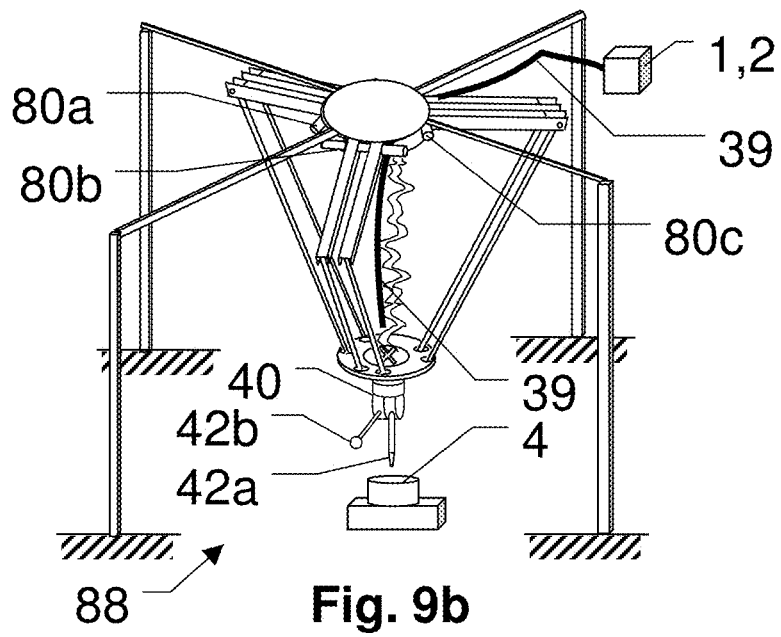

FIG. 9b shows an example of another embodiment of a CMM 88, in which the OCT measurement is guided to the measuring end of the measuring head 42a via a light guide 39. Here, the measurement radiation is deflected 2 onto the input coupling area of the light guide 39 when input coupling the measurement radiation of the OCT measurement structure 1. This deflection 2 yields a linear or areal scanning region on the test object 4, said scanning region being displaceable by moving the movement shafts 80a, 80b, 80c on the object.

Figure 10:
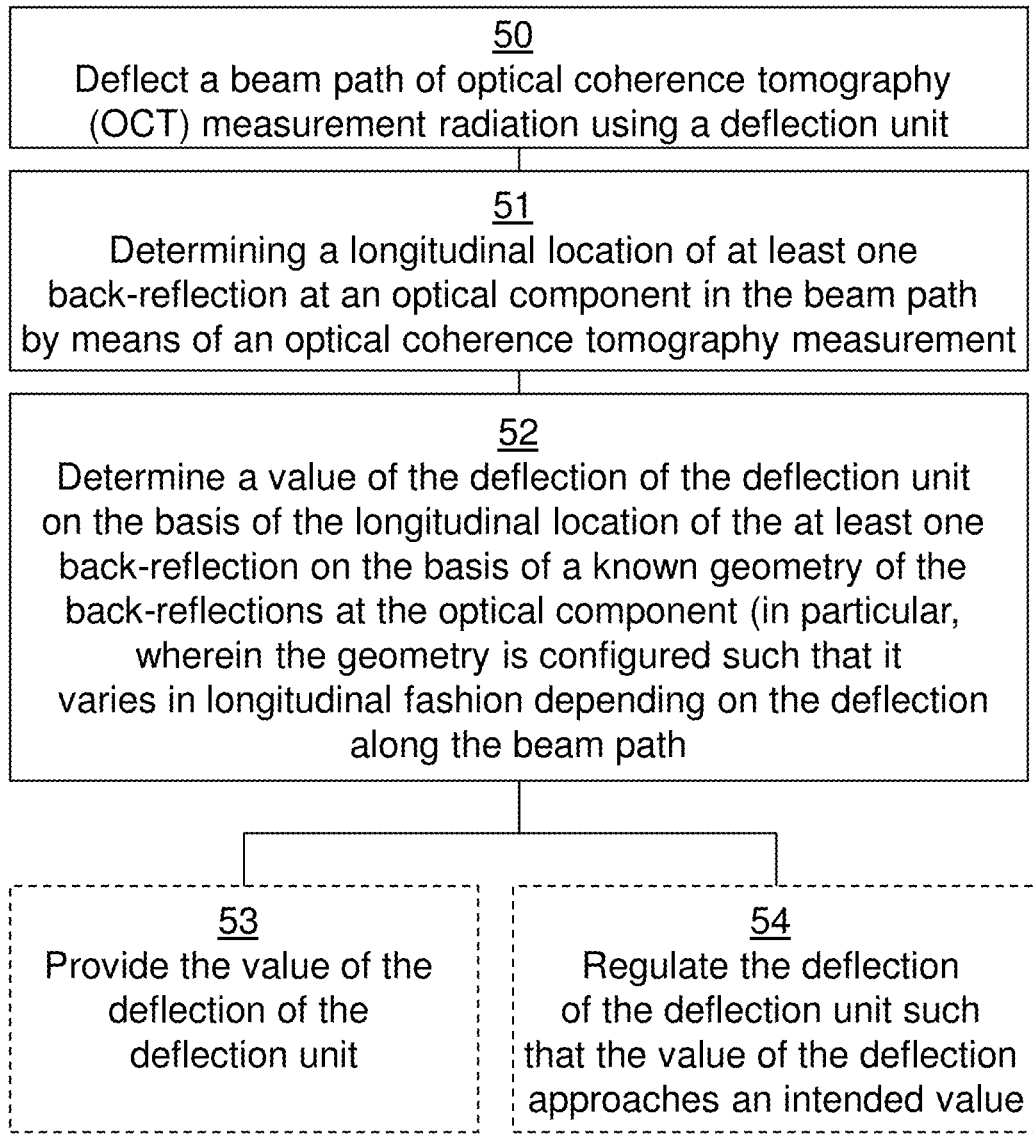
FIG. 10 shows a flowchart of an example of an embodiment according to the invention of a process for determining the deflection according to the present invention.

FIG. 10 shows a flowchart of an embodiment of a method or a process for determining the deflection of a deflection unit 2 using an OCT measuring device 1.

In block 50, there is a controlled variable deflection of a beam path of optical coherence tomography (OCT) measurement radiation using a deflection unit 2 for optical radiation.

In block 51, a longitudinal location of at least one back-reflection at an optical component in the beam path of the OCT measurement radiation is determined by means of an optical coherence tomography measurement, by means of which a longitudinal location of the back-reflection is ascertained along the beam path.

In block 52, a value of the deflection of the deflection unit is determined on the basis of the longitudinal location of the at least one back-reflection along the beam path. In particular, this can be implemented on the basis of a known dependence on the deflection of the geometry of the back-reflections at the optical component. Here, in particular, the optical component can be specifically formed in such a way that the longitudinal location varies depending on the deflection, in particular wherein there is an unambiguous assignment of one or more of the longitudinal locations to a value of the deflection in each case.

In block 53, there then optionally is a provision of the ascertained, current value of the deflection of the deflection unit, for example in the form of a length or angle specification, which characterizes a position of that site on the object that is illuminated by the OCT measurement radiation.

In block 54, there is, likewise optionally, a regulation of the deflection of the deflection unit such that the value of the deflection approximates an intended value, for example by way of a control loop which provides an actuation signal for the deflection unit 2 such that the deflection approaches the predetermined intended value.

In conclusion, a specific aspect of many of the embodiments of the invention listed here, which relate to a scanning OCT measurement of an object 4, can be considered that of a detection of different deflection angle-dependent distance values 35, 36 at an optical element 3 in the (measurement) beam path 5 of a beam path 5, deflectable by a deflection unit 2, being implemented by means of an OCT measurement 1. An accurate lateral position of the deflection 2 can be assigned to a second distance measurement value of the OCT measurement at a test object 4 with knowledge of these distance values 35, 36. The distance signal 35, 36 relevant here can be produced, for example, by means of a partly transmissive (in particular largely transmissive) optical element 3 in the deflected OCT beam path 5, said optical element being stepped in lateral or angle-dependent fashion in terms of its thickness in the propagation direction and providing appropriate weak back-reflections at or in the optical element 3, which are capturable by the OCT measurement.

FIG. 11*a* to FIG. 11*h* show, in non-exhaustive fashion, a few further exemplary embodiments of optical elements 3 that are embodied for the present invention.

In addition to the aforementioned embodiment in FIG. 2*a*, shown yet again in FIG. 11*a*, with an arrangement of a retardation plate (or reflection plate, RP) and a lens (e.g., an objective lens), another embodiment also applies a unification or integration of the features of the two aforementioned optical components in a single element, in particular a diffractive element. Appropriate optical elements, coatings can be developed in dedicated fashion to this end or it is also possible, if need be, to use or, if need be, appropriately modify elements already present in the beam path in any case in order to obtain the (weak) back-reflections, used by the invention, of the optical element transmitted through the deflected beam path. The discrete steps of the back-reflections in terms of their beam-longitudinal direction shown in this example are one possible embodiment in this case. Here, the steps in one embodiment can adopt an absolutely unique distance value for each deflection and can adopt a value that is unique relative in relation to one or more other reflections in another embodiment. In yet another embodiment, this can also adopt no unique value in relation to the deflection, but, for instance, be a relative encoded value in relation to its surroundings, for example an incremental code, etc. An embodiment with multi-value encoding in the longitudinal depth is also a further embodiment according to the invention. Here, such encoding can be implemented in one-dimensional or else two-dimensional fashion by way of the deflection positions on the surface of the optical element 3.

Here, a lens is used as optical element 3 in FIG. 11*b*, said lens, if need be, being able to be formed with appropriate coatings in order to obtain back-reflections which advantageously are suitable for capture with the specifically employed OCT measuring method. If a plurality of lenses (or other optical elements) are cemented, it is also possible to employ a reflection at the transition thereof.

In an example of an embodiment shown in FIG. 11*c*, a Fresnel lens, for instance, can be used inter alia within the meaning of the invention as a stepped and simultaneously diffracting optical element 3.

In FIG. 11*d*, the optical element is embodied as a plate which has reflections at different depths depending on the lateral position on the plate. In addition to the use of a wedge form (wedges), such reflections that are localized differently in the plate thickness can also be obtained, for example, by cementing a plurality of elements and using the reflections at interfaces thereof. A targeted introduction of imperfections into the transparent material of the optical element, e.g., by laser engraving, doping, diffusion, targeted use of contaminants or any different option, can also be used to generate defined back-reflections. In addition to the shown linear gradation of the optical path length to the back-reflection, it is also possible to apply a quasi-continuous or else a stepped or step-shaped profile, either in one dimension or on an area in two-dimensional fashion depending on the application.

An embodiment with more than one back-reflection for a lateral position on the optical element can also be formed with the tomographic OCT measurement in accordance with the invention. By way of example, this can be implemented with the use of two OCT-measurable reflections, whose known, relative spacing from one another provides an encoding of the lateral position on the optical element. However, in another example, there can also be a multi-value encoding at a lateral position by a plurality of reflection points at different longitudinal depths, which together form a codeword, the evaluation of which renders the lateral position determinable, for example as an absolute code, in a respective local absolute encoding, as an incremental code or as a mixed form of absolute and incremental code.

A two-dimensional example is shown in FIG. 11*e*, as an embodiment in which a two-dimensional retardation plate is applied, weak back-reflections for transmitting optical radiation being formed in the plate thickness at different depths depending on the lateral position on the plate, said back-reflections having an intensity that is capturable by an OCT measurement. In particular, since the back-reflections only need have a low intensity for a capture by means of an OCT measurement, even a plurality of such back-reflections only impair the optical radiation, transmitted by the optical element, to such a small extent that the object is still sufficiently measurable by means of said radiation.

For instance, a moving optical element (such as a mirror or a prism, for example) can also be used to obtain the beam deflection in a specific embodiment, as illustrated in FIG. 11*f*, in order to provide reflections of the OCT radiation that change in terms of their beam-longitudinal position depending on the deflection. In particular, the beam-deflecting optical element can be embodied in such a way here that the optical path that the beam passes along in the mirror glass has an embodiment with a different length depending on the angle. Thus, for example, a path can be formed, for instance, between an entrance and an exit reflection at a beam-deflecting mirror or prism or a path can be formed between entrance or exit and a reflection plane.

FIG. 11g shows an example of an already mentioned use of steps at the input and/or output coupling area of a light guide 39, for example as a result of the individual fibers with different lengths, an appropriately formed cut of the fiber end, etc.

What is claimed is:

1. An optical system comprising:
   an optical coherence tomography (OCT) measuring device;
   an optical component;
   a beam deflection unit for laterally deflecting the position or angle of a beam path of the OCT measuring device, wherein the optical component is in the beam path, said optical component being embodied in such a way that a back-reflection of the optical component has a different configuration in terms of its longitudinal location along the beam path depending on the lateral position of the deflected beam path; and
   an evaluation unit which is embodied in such a way that a value of the lateral position or angle deflection of the beam deflection unit is determined on the basis of a longitudinal location of the back-reflection at the optical component determined by the OCT measuring device,
   wherein the evaluation unit is additionally configured to determine a profile of a test object based on an OCT measurement, which test object is optically measured by the OCT measuring device at the same time as the optical component.

2. The optical system according to claim 1, wherein the optical component is arranged downstream of the beam deflection unit and the beam path passes through the optical component.

3. The optical system according to claim 1, wherein the optical component is embodied in such a way that the optical component has a back-reflection at different lateral positions on the optical component, said back-reflection having a different OCT measuring distance in a longitudinal location lying substantially orthogonal to the lateral direction.

4. The optical system according to claim 1, wherein the position or angle deflection of the beam deflection unit and the profile of the test object are determined based on the optical measurement by the OCT measuring device carried out along the beam path of the OCT measurement.

5. The optical system according to claim 1, the optical system comprising a light guide, wherein the beam path is laterally deflected by the deflection unit to an input coupling area of the light guide and, via the light guide, output coupled toward the test object to a point at the output coupling area of the light guide that corresponds to a point on the input coupling area.

6. The optical system according to claim 1, wherein the position or angle deflection of the beam path is implemented by a movable, reflecting area.

7. The optical system according to claim 6, wherein the optical component that provides the back-reflection for the OCT measurement is part of the beam deflection unit.

8. The optical system according to claim 1, wherein the optical system is configured in such a way so that it is attachable to a coordinate measuring machine (CMM) which provides a measurement in the form of optically scanning surfaces of the test object using the optical system.

9. A method for determining a value of a lateral position or angle deflection of a beam deflection unit in an optical system and a profile of a test object, the method comprising:
   using an optical coherence tomography (OCT) measurement to ascertain at least one longitudinal location of at least one back-reflection at an optical component in the beam path of measurement radiation, deflected by the beam deflection unit, of the OCT measurement;
   determining the value of the lateral position or angle deflection of the beam deflection unit on the basis of the ascertained longitudinal location of the back-reflection; and
   determining a profile of a test object by optically measuring the test object using the same OCT measurement as used for ascertaining the at least one longitudinal location.

10. The method according to claim 9, wherein the value of the lateral position or angle deflection of the beam deflection unit is determined on the basis of a relationship between the ascertained longitudinal location of the back-reflection at the optical component and the lateral position of the deflected measurement radiation on the optical component.

11. The method according to claim 9, wherein the optical component is transmitted by the measurement radiation.

12. The method according to claim 9, wherein the optical component has a different longitudinal location of the back-reflection depending on a lateral position of the optical measurement radiation on the optical component.

13. A device for determining a value of a changeable lateral position or angle deflection, the device comprising:
   a beam deflection unit for obtaining the changeable lateral position or angle deflection of a beam path of an OCT measuring device;
   an optical component, in particular a substantially transmissive optical component, wherein the optical component is in the beam path, said optical component being embodied in such a way that a back-reflection of the optical component has a different configuration in terms of its longitudinal location along the beam path depending on the lateral position of the deflected beam path;
   an OCT measuring device for determining a longitudinal location of a back-reflection, which occurs along a beam path, deflected by the beam deflection unit, of measurement radiation of the OCT measuring device at the optical component; and
   an evaluation unit embodied in such a way that the value of the lateral position or angle deflection of the beam deflection unit is determinable on the basis of the longitudinal location of the back-reflection, determined by the OCT measuring device, at the optical component,
   wherein the evaluation unit is additionally configured to determine a profile of a test object based on an OCT measurement, which test object is optically measured by the OCT measuring device at the same time as the optical component.

* * * * *